US010616812B2

(12) United States Patent
Chen et al.

(10) Patent No.: US 10,616,812 B2
(45) Date of Patent: Apr. 7, 2020

(54) VOICE SERVICE HANDOVER METHOD AND DEVICE

(71) Applicant: Huawei Technologies Co., Ltd., Shenzhen (CN)

(72) Inventors: Lifu Chen, Shenzhen (CN); Ridong Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 208 days.

(21) Appl. No.: 15/632,079

(22) Filed: Jun. 23, 2017

(65) Prior Publication Data

US 2017/0295530 A1 Oct. 12, 2017

Related U.S. Application Data

(63) Continuation of application No. PCT/CN2015/082709, filed on Jun. 29, 2015.

(30) Foreign Application Priority Data

Dec. 24, 2014 (CN) .......................... 2014 1 0817864

(51) Int. Cl.
*H04W 36/14* (2009.01)
*H04W 4/90* (2018.01)
(Continued)

(52) U.S. Cl.
CPC .............. *H04W 36/14* (2013.01); *H04W 4/90* (2018.02); *H04W 36/0016* (2013.01);
(Continued)

(58) Field of Classification Search
CPC . H04W 36/0022; H04W 36/14; H04W 88/18; H04W 8/08; H04W 88/16
(Continued)

(56) References Cited

U.S. PATENT DOCUMENTS

| 2012/0039303 A1* | 2/2012 | Stenfelt ............. | H04W 36/0022 370/331 |
| 2012/0040662 A1* | 2/2012 | Rahman ............ | H04W 36/0055 455/423 |
| 2013/0301614 A1* | 11/2013 | Lu ..................... | H04W 36/0022 370/331 |

(Continued)

FOREIGN PATENT DOCUMENTS

| CN | 101931988 A | 12/2010 |
| CN | 104010318 A | 8/2014 |

(Continued)

OTHER PUBLICATIONS

Sherif et al.,"Voice Evolution in 4G Networks," Design, Deployment and Performance of 4G-LTE Networks, XP055236584, pp. 445-506, John Wiley and Sons, Ltd., Chichester, UK, (Apr. 15, 2014).

(Continued)

*Primary Examiner* — Sam Bhattacharya
(74) *Attorney, Agent, or Firm* — Leydig, Voit & Mayer, Ltd.

(57) ABSTRACT

Embodiments of the present invention disclose a voice service handover method and a device, and relate to the communications field, so as to resolve a problem that reliability of a voice service of UE is reduced due to an exception that occurs on a network side of an LTE network. A specific solution is as follows: An MME determines that an exception occurs on a network side of an LTE network, where a voice bearer of target UE is established on the network side of the LTE network; and the MME sends, to an eNodeB, an SRVCC handover request message that carries an identifier of the target UE, so that the eNodeB hands over a voice service of the target UE from the LTE network to a CS network. The present invention is applied in a voice service handover process.

12 Claims, 14 Drawing Sheets

(51) Int. Cl.
*H04W 36/00* (2009.01)
*H04W 80/10* (2009.01)
*H04W 88/14* (2009.01)
*H04W 88/16* (2009.01)

(52) U.S. Cl.
CPC ....... *H04W 36/0022* (2013.01); *H04W 80/10* (2013.01); *H04W 88/14* (2013.01); *H04W 88/16* (2013.01)

(58) Field of Classification Search
USPC .................................. 455/436; 370/331, 332
See application file for complete search history.

(56) References Cited

U.S. PATENT DOCUMENTS

| 2015/0365851 | A1 | 12/2015 | Wang et al. |
| 2016/0242087 | A9 | 8/2016 | Wang et al. |

FOREIGN PATENT DOCUMENTS

| CN | 104038964 A | 9/2014 |
| EP | 2897440 A1 | 7/2015 |
| EP | 2958365 A1 | 12/2015 |
| EP | 3029966 A1 | 6/2016 |
| WO | 2008023162 A2 | 2/2008 |
| WO | 2010044730 A2 | 4/2010 |
| WO | 2014134916 A1 | 9/2014 |

OTHER PUBLICATIONS

Remy et al., "LTE Standards and Architecture," LTE Standards, XP055413085, pp. 1-112, John Wiley and Sons, Inc., Hoboken, NJ, USA, (Oct. 10, 2014).

"3rd Generation Partnership Project; Technical Specification Group Services and System Aspects; Single Radio Voice Call Continuity (SRVCC); Stage 2 (Release 12)," 3GPP TS 23.216 V12.2.0, pp. 1-69, 3rd Generation Partnership Project, Valbonne, France (Dec. 2014).

"3rd Generation Partnership Project; Technical Specification Group Services and System Aspects; Single Radio Voice Call Continuity (SRVCC) enhancements; Stage 2 (Release 10)," 3GPP TR 23.856 V.10.0.0, pp. 1-80, 3rd Generation Partnership Project, Valbonne, France (Sep. 2010).

* cited by examiner

US 10,616,812 B2

VOICE SERVICE HANDOVER METHOD AND DEVICE

CROSS-REFERENCE TO RELATED APPLICATIONS

This application is a continuation of International Application No. PCT/CN2015/082709, filed on Jun. 29, 2015, which claims priority to Chinese Patent Application No. 201410817864.2, filed on Dec. 24, 2014. The disclosures of the aforementioned applications are hereby incorporated by reference in their entireties.

TECHNICAL FIELD

The embodiments of the present invention relate to the communications field, and in particular, to a voice service handover method and a device.

BACKGROUND

On a Long Term Evolution (LTE) network, user equipments (UE) can communicate with each other by using voice over LTE (VoLTE). VoLTE is a type of voice service that is based on an LTE system and an Internet Protocol multimedia system (IMS) network.

When UEs are communicating with each other by using VoLTE, reliability of a voice service of the UEs is reduced if an exception occurs on a network side (the network side is a network between an evolved NodeB (eNodeB) and a packet data network gateway (PGW) of an LTE system. For example, if a network between a serving gateway (SGW) and the PGW is interrupted, the ongoing voice service between the UEs is interrupted. Consequently, reliability of the voice service of the UEs is reduced.

Therefore, how to improve reliability of a voice service of UE is an urgent problem to be resolved by a person in the art.

SUMMARY

The embodiments of the present invention provides a voice service handover method and a device, so as to resolve a problem that reliability of a voice service of UE is reduced due to an exception that occurs on a network side of an LTE network.

To achieve the foregoing objective, the following technical solutions are used in the embodiments of the present invention:

According to a first aspect of the embodiments of the present invention, a voice service handover method is provided, including:

determining, by a mobility management entity MME, that an exception occurs on a network side of a Long Term Evolution LTE network, where a voice bearer of target user equipment UE is established on the network side of the LTE network; and sending, by the MME to an evolved NodeB eNodeB, a single radio voice call continuity SRVCC handover request message that carries an identifier of the target UE, so that the eNodeB hands over a voice service of the target UE from the LTE network to a circuit switched CS network.

With reference to the first aspect of the embodiments of the present invention, in a first possible implementation manner, the determining, by a mobility management entity MME, that an exception occurs on a network side of a Long Term Evolution LTE network includes:

receiving, by the MME, a handover request message sent by the eNodeB, where the handover request message is used to notify the MME that the target UE needs to be handed over from the eNodeB to a target eNodeB; and determining, by the MME, that the target UE fails to be handed over from the eNodeB to the target eNodeB.

With reference to the first aspect of the embodiments of the present invention, in a second possible implementation manner, the determining, by a mobility management entity MME, that an exception occurs on a network side of a Long Term Evolution LTE network includes:

receiving, by the MME, a connection exception message sent by a first network device, where the connection exception message is used to feed back a result that an exception occurs on a user plane connection, and the connection exception message includes an evolved packet system EPS bearer identity of at least one UE that meets a predetermined condition; and before the sending, by the MME to an evolved NodeB eNodeB, a single radio voice call continuity SRVCC handover request message that carries an identifier of the target UE, the method further includes:

determining, by the MME according to the EPS bearer identity of the UE that meets the predetermined condition, UE whose voice bearer is established on the network side of the LTE network as the target UE; or determining, by the MME according to the EPS bearer identity of the UE that meets the predetermined condition, UE whose voice bearer is established on the network side of the LTE network and that supports SRVCC handover as the target UE.

With reference to the second possible implementation manner of the first aspect of the present invention, in a third possible implementation manner, the connection exception message is sent by the first network device after the first network device detects that an exception occurs on a user plane connection between the first network device and a second network device; and the UE that meets the predetermined condition is UE that performs service transmission by using the user plane connection between the first network device and the second network device.

With reference to the second possible implementation manner of the first aspect of the present invention, in a fourth possible implementation manner, the connection exception message is sent by the first network device after the first network device determines that the first network device needs to be restarted; and the UE that meets the predetermined condition is UE that performs service transmission by using a user plane of the first network device.

With reference to the third possible implementation manner of the first aspect of the present invention, in a fifth possible implementation manner, that an exception occurs on the user plane connection includes either of the following: the user plane connection is interrupted or congestion occurs on the user plane connection.

With reference to the fifth possible implementation manner of the first aspect of the present invention, in a sixth possible implementation manner, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold, where the first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to a second aspect of the embodiments of the present invention, a voice service handover method is provided, including:

detecting, by a first network device, that an exception occurs on a network side of a Long Term Evolution LTE network;

obtaining, by the first network device, an evolved packet system EPS bearer identity of at least one user equipment UE that meets a predetermined condition; and sending, by the first network device, a connection exception message to a mobility management entity MME, where the connection exception message is used to feed back a result that an exception occurs on a user plane connection, and the connection exception message includes the EPS bearer identity of the at least one UE that meets the predetermined condition.

With reference to the second aspect of the embodiments of the present invention, in a first possible implementation manner, the detecting, by a first network device, that an exception occurs on a network side of an LTE network includes:

detecting, by the first network device, that an exception occurs on a user plane connection between the first network device and a second network device; and the UE that meets the predetermined condition is UE that performs service transmission by using the user plane connection between the first network device and the second network device.

With reference to the second aspect of the present invention, in a second possible implementation manner, the detecting, by a first network device, that an exception occurs on a network side of an LTE network includes:

detecting, by the first network device, that the first network device needs to be restarted; and the UE that meets the predetermined condition is UE that performs service transmission by using a user plane of the first network device.

With reference to the first possible implementation manner of the second aspect of the present invention, in a third possible implementation manner, that an exception occurs on the user plane connection includes either of the following: the user plane connection is interrupted or congestion occurs on the user plane connection.

With reference to the third possible implementation manner of the second aspect of the present invention, in a fourth possible implementation manner, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold, where the first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to a third aspect of the embodiments of the embodiments of the present invention, a voice service handover method is provided, including:

receiving, by an evolved NodeB eNodeB, a single radio voice call continuity SRVCC handover request message that carries an identifier of target user equipment UE and that is sent by a mobility management entity MME; and handing over, by the eNodeB, a voice service of the target UE from a Long Term Evolution LTE network to a circuit switched CS network.

With reference to the third aspect of the embodiments of the present invention, in a first possible implementation manner, before the receiving, by an evolved NodeB eNodeB, a single radio voice call continuity SRVCC handover request message that carries an identifier of target user equipment UE and that is sent by a mobility management entity MME, the method further includes:

sending, by the eNodeB, a handover request message to the MME, where the handover request message is used to notify the MME that the target UE needs to be handed over from the eNodeB to a target eNodeB.

With reference to the first possible implementation manner of the third aspect of the present invention, in a second possible implementation manner, before the handing over, by the eNodeB, a voice service of the target UE from a Long Term Evolution LTE network to a circuit switched CS network, the method further includes:

determining, by the eNodeB, that the eNodeB fails to continue providing the voice service to the target UE.

With reference to any one of the third aspect of the embodiments of the present invention, or the first or the second possible implementation manner of the third aspect, in a third possible implementation manner, before the handing over, by the eNodeB, a voice service of the target UE from a Long Term Evolution LTE network to a circuit switched CS network, the method further includes:

receiving, by the eNodeB, a radio measurement report of the CS network that is sent by the target UE; and the handing over, by the eNodeB, a voice service of the target UE from a Long Term Evolution LTE network to a circuit switched CS network includes:

handing over, by the eNodeB, the voice service of the target UE from the LTE network to the CS network according to the radio measurement report of the CS network.

With reference to the third possible implementation manner of the third aspect of the present invention, in a fourth possible implementation manner, before the receiving, by the eNodeB, a radio measurement report of the CS network that is sent by the target UE, the method further includes:

sending, by the eNodeB, an instruction message to the target UE, where the instruction message is used to instruct the target UE to report the radio measurement report of the CS network.

According to a fourth aspect of the embodiments of the present invention, a voice service handover method is provided, including:

detecting, by an evolved NodeB eNodeB, whether an exception occurs on a user plane connection between the eNodeB and a serving gateway SGW;

when detecting that an exception occurs on the user plane connection between the eNodeB and the SGW, obtaining, by the eNodeB, an evolved packet system EPS bearer identity of UE that meets a predetermined condition, where the UE that meets the predetermined condition is UE that performs service transmission by using the user plane connection between the eNodeB and the SGW;

determining, by the eNodeB according to the EPS bearer identity of the UE, UE whose voice bearer is established as target UE; or determining, by the eNodeB according to the EPS bearer identity of the UE, UE whose voice bearer is established and that supports single radio voice call continuity SRVCC handover as the target UE; and handing over, by the eNodeB, a voice service of the target UE from a Long Term Evolution LTE network to a circuit switched CS network.

With reference to the fourth aspect of the embodiments of the present invention, in a first possible implementation manner, before the handing over, by the eNodeB, a voice service of the target UE from a Long Term Evolution LTE network to a circuit switched CS network, the method further includes:

receiving, by the eNodeB, a radio measurement report of the CS network that is sent by the target UE; and the handing over, by the eNodeB, a voice service of the target UE from a Long Term Evolution LTE network to a circuit switched CS network includes:

handing over, by the eNodeB, the voice service of the target UE from the LTE network to the CS network according to the radio measurement report of the CS network.

With reference to the first possible implementation manner of the fourth aspect of the present invention, in a second possible implementation manner, before the receiving, by the eNodeB, a radio measurement report that is sent by the target UE, the method further includes:

sending, by the eNodeB, an instruction message to the target UE, where the instruction message is used to instruct the target UE to report the radio measurement report of the CS network.

With reference to any one of the fourth aspect of the embodiments of the present invention, or the first or the second possible implementation manner of the fourth aspect, in a third possible implementation manner, that an exception occurs on the user plane connection includes either of the following: the user plane connection is interrupted or congestion occurs on the user plane connection.

With reference to the third possible implementation manner of the fourth aspect of the present invention, in a fourth possible implementation manner, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold, where the first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to a fifth aspect of the embodiments of the present invention, a mobility management entity MME is provided, where the MME includes a first determining unit and a first sending unit;

the first determining unit is configured to determine that an exception occurs on a network side of a Long Term Evolution LTE network, where a voice bearer of target user equipment UE is established on the network side of the LTE network; and the first sending unit is configured to send, to an evolved NodeB eNodeB, a single radio voice call continuity SRVCC handover request message that carries an identifier of the target UE, so that the eNodeB hands over a voice service of the target UE from the LTE network to a circuit switched CS network.

With reference to the fifth aspect of the embodiments of the present invention, in a first possible implementation manner, the first determining unit includes a first receiving module and a first determining module;

the first receiving module is configured to receive a handover request message sent by the eNodeB, where the handover request message is used to notify the MME that the target UE needs to be handed over from the eNodeB to a target eNodeB; and the first determining module is configured to determine that the target UE fails to be handed over from the eNodeB to the target eNodeB.

With reference to the fifth aspect of the embodiments of the present invention, in a second possible implementation manner, the MME further includes a second determining unit, and the first determining unit includes a second receiving module;

the second receiving module is configured to receive a connection exception message sent by a first network device, where the connection exception message is used to feed back a result that an exception occurs on a user plane connection, and the connection exception message includes an evolved packet system EPS bearer identity of at least one UE that meets a predetermined condition; and the second determining unit is configured to: before the first sending unit sends, to the evolved NodeB eNodeB, the single radio voice call continuity SRVCC handover request message that carries the identifier of the target UE, determine, according to the EPS bearer identity of the UE that meets the predetermined condition, UE whose voice bearer is established on the network side of the LTE network as the target UE; or determine, according to the EPS bearer identity of the UE that meets the predetermined condition, UE whose voice bearer is established on the network side of the LTE network and that supports SRVCC handover as the target UE.

With reference to the second possible implementation manner of the fifth aspect of the present invention, in a third possible implementation manner, the second receiving module is specifically configured to receive the connection exception message that is sent by the first network device after the first network device detects that an exception occurs on a user plane connection between the first network device and a second network device; and the UE that meets the predetermined condition is UE that performs service transmission by using the user plane connection between the first network device and the second network device.

With reference to the second possible implementation manner of the fifth aspect of the present invention, in a fourth possible implementation manner, the second receiving module is specifically configured to receive the connection exception message that is sent by the first network device after the first network device determines that the first network device needs to be restarted; and the UE that meets the predetermined condition is UE that performs service transmission by using a user plane of the first network device.

With reference to the second possible implementation manner of the fifth aspect of the present invention, in a fifth possible implementation manner, that an exception occurs on the user plane connection includes either of the following: the user plane connection is interrupted or congestion occurs on the user plane connection.

With reference to the fifth possible implementation manner of the fifth aspect of the present invention, in a sixth possible implementation manner, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold, where the first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to a sixth aspect of the embodiments of the present invention, a first network device is provided, where the first network device includes a first detection unit, a first obtaining unit, and a second sending unit;

the first detection unit is configured to detect that an exception occurs on a network side of a Long Term Evolution LTE network;

the first obtaining unit is configured to obtain an evolved packet system EPS bearer identity of at least one user equipment UE that meets a predetermined condition; and the second sending unit is configured to send a connection exception message to a mobility management entity MME, where the connection exception message is used to feed back a result that an exception occurs on a user plane connection, and the connection exception message includes the EPS bearer identity of the at least one UE that meets the predetermined condition.

With reference to the sixth aspect of the embodiments of the present invention, in a first possible implementation manner, the first detection unit is specifically configured to detect that an exception occurs on a user plane connection between the first network device and a second network device, and the UE that meets the predetermined condition is UE that performs service transmission by using the user plane connection between the first network device and the second network device.

With reference to the sixth aspect of the embodiments of the present invention, in a second possible implementation manner, the first detection unit is specifically configured to detect that the first network device needs to be restarted; and the UE that meets the predetermined condition is UE that performs service transmission by using a user plane of the first network device.

With reference to the first possible implementation manner of the sixth aspect of the present invention, in a third possible implementation manner, that an exception occurs on the user plane connection includes either of the following: the user plane connection is interrupted or congestion occurs on the user plane connection.

With reference to the third possible implementation manner of the sixth aspect of the present invention, in a fourth possible implementation manner, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold, where a maximum value of the first preset threshold is a packet loss rate of the user plane connection when the user terminal UE fails to use the user plane connection, a maximum value of the second preset threshold is a delay of the user plane connection when the UE fails to use the user plane connection, and a maximum value of the third preset threshold is a jitter of the user plane connection when the UE fails to use the user plane connection.

According to a seventh aspect of the embodiments of the present invention, an evolved NodeB eNodeB is provided, where the eNodeB includes a first receiving unit and a first handover unit;

the first receiving unit is configured to receive a single radio voice call continuity SRVCC handover request message that carries an identifier of target user equipment UE and that is sent by a mobility management entity MME; and the first handover unit is configured to hand over a voice service of the target UE that is received by the first receiving unit from a Long Term Evolution LTE network to a circuit switched CS network.

With reference to the seventh aspect of the embodiments of the present invention, in a first possible implementation manner, the eNodeB further includes a third sending unit; and the third sending unit is configured to send a handover request message to the MME before the first receiving unit receives the single radio voice call continuity SRVCC handover request message that carries the identifier of the target user equipment UE and that is sent by the mobility management entity MME, where the handover request message is used to notify the MME that the target UE needs to be handed over from the eNodeB to a target eNodeB.

With reference to the first possible implementation manner of the seventh aspect of the present invention, in a second possible implementation manner, the eNodeB further includes a third determining unit; and the third determining unit is configured to: before the first handover unit hands over the voice service of the target UE from the Long Term Evolution LTE network to the circuit switched CS network, determine that the eNodeB fails to continue providing the voice service to the target UE.

With reference to any one of the seventh aspect of the embodiments of the present invention, or the first or the second possible implementation manner of the seventh aspect, in a third possible implementation manner, the eNodeB further includes a second receiving unit;

the second receiving unit is configured to: before the first handover unit hands over the voice service of the target UE from the Long Term Evolution LTE network to the circuit switched CS network, receive a radio measurement report of the CS network that is sent by the target UE; and the first handover unit is specifically configured to hand over the voice service of the target UE from the LTE network to the CS network according to the radio measurement report of the CS network that is received by the second receiving unit.

With reference to the third possible implementation manner of the seventh aspect of the present invention, in a fourth possible implementation manner, the eNodeB further includes a fourth sending unit; and the fourth sending unit is configured to send an instruction message to the target UE before the second receiving unit receives the radio measurement report of the CS network that is sent by the target UE, where the instruction message is used to instruct the target UE to report the radio measurement report of the CS network.

According to an eighth aspect of the embodiments of the present invention, an evolved NodeB eNodeB is provided, where the eNodeB includes a second detection unit, a second obtaining unit, a fourth determining unit, and a second handover unit;

the second detection unit is configured to detect whether an exception occurs on a user plane connection between the eNodeB and a serving gateway SGW;

the second obtaining unit is configured to: when the second detection unit detects that an exception occurs on the user plane connection between the eNodeB and the SGW, obtain an evolved packet system EPS bearer identity of UE that meets a predetermined condition, where the UE that meets the predetermined condition is UE that performs service transmission by using the user plane connection between the eNodeB and the SGW;

the fourth determining unit is configured to: determine, according to the EPS bearer identity of the UE that is obtained by the second obtaining unit, UE whose voice bearer is established as target UE; or determine, according to the EPS bearer identity of the UE that is obtained by the second obtaining unit, UE whose voice bearer is established and that supports single radio voice call continuity SRVCC handover as the target UE; and the second handover unit is configured to hand over a voice service of the target UE determined by the fourth determining unit from a Long Term Evolution LTE network to a circuit switched CS network.

With reference to the eighth aspect of the embodiments of the present invention, in a first possible implementation manner, the eNodeB further includes a third receiving unit;

the third receiving unit is configured to: before the second handover unit hands over the voice service of the target UE from the Long Term Evolution LTE network to the circuit switched CS network, receive a radio measurement report of the CS network that is sent by the target UE; and the second handover unit is specifically configured to hand over the voice service of the target UE from the LTE network to the CS network according to the radio measurement report of the CS network that is received by the third receiving unit.

With reference to the first possible implementation manner of the eighth aspect of the present invention, in a second possible implementation manner, the eNodeB further includes a fifth sending unit; and the fifth sending unit is configured to send an instruction message to the target UE before the third receiving unit receives the radio measurement report sent by the target UE, where the instruction message is used to instruct the target UE to report the radio measurement report of the CS network.

With reference to any one of the eighth aspect of the embodiments of the present invention, or the first or the second possible implementation manner of the eighth aspect, in a third possible implementation manner, that an exception occurs on the user plane connection includes either of the following: the user plane connection is interrupted or congestion occurs on the user plane connection.

With reference to the third possible implementation manner of the eighth aspect of the present invention, in a fourth possible implementation manner, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold, where the first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to the voice service handover method and the device that are provided in the embodiments of the present invention, after determining that an exception occurs on a network side of an LTE network, an MME sends, to an eNodeB, an SRVCC handover request message that carries an identifier of target UE, so that the eNodeB hands over a voice service of the target UE from the LTE network to a CS network. After determining that an exception occurs on the network side of the LTE network, the MME can instruct the eNodeB to hand over the voice service of the target UE from the LTE network to the CS network. Therefore, impact of the network-side exception on the voice service of the UE is avoided, and reliability of the voice service of the UE is improved.

BRIEF DESCRIPTION OF DRAWINGS

To describe the technical solutions in the embodiments of the present invention more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

To describe the technical solutions in the embodiments of the present invention or in the conventional art more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
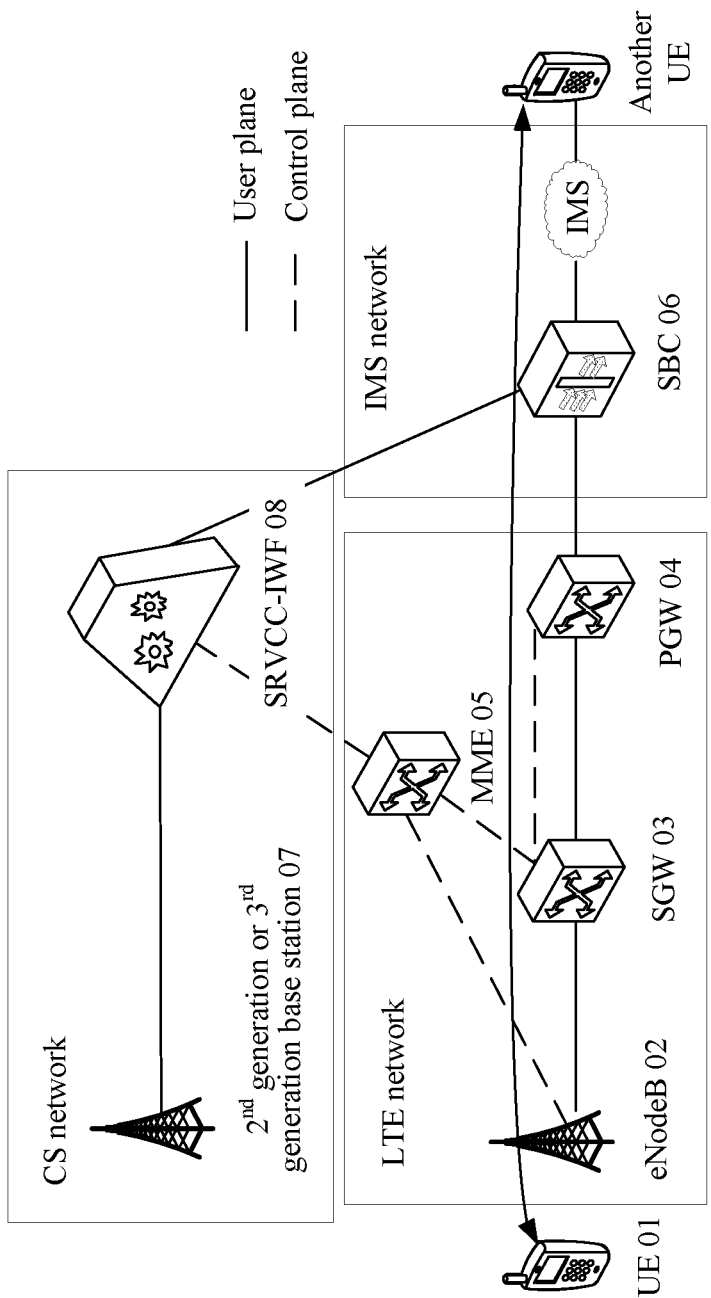
FIG. 1 is a schematic architectural diagram of a system for implementing a voice service handover method according to an embodiment of the present invention.

As shown in FIG. 1, FIG. 1 shows an architectural diagram of a system to which a voice service handover method is applied according to an embodiment of the present invention. The system includes an eNodeB 02, an SGW 03, a PGW 04, and a mobility management entity (MME) 05 that are on an LTE network, a session border controller (SBC) 06 on an IMS network, a $2^{nd}$ generation or a $3^{rd}$ generation base station 07 on a circuit switched (CS) network, a single radio voice call continuity-interworking function (SRVCC-IWF) 08 on the CS network, and UE 01. Generally, the UE 01 may perform voice communication with another UE by using the LTE network and the IMS network. When an exception occurs on a user plane or a control plane on a network side of the LTE network shown in FIG. 1, quality of communication between the UE 01 and the another UE is affected. According to the voice service handover method provided in the embodiments of the present invention, a voice service of the UE 01 may be handed over from the LTE network to the CS network, so that the UE 01 performs voice communication with the another UE by using the CS network and the IMS network, to ensure the quality of communication between the UE 01 and the another UE.

For ease of understanding by a person skilled in the art, for specific implementation processes of the technical solutions provided in the present invention, specifically refer to the following embodiments provided in the present invention.

Figure 2:
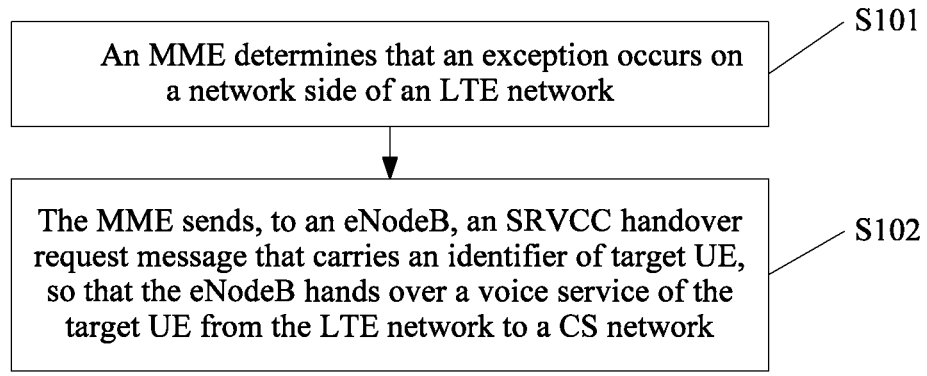
FIG. 2 is a flowchart of a voice service handover method according to an embodiment of the present invention.

An embodiment of the present invention provides a voice service handover method. As shown in FIG. 2, the method may include the following steps.

S101. An MME determines that an exception occurs on a network side of an LTE network.

A voice bearer of target UE is established on the network side of the LTE network. The target UE is UE whose voice bearer is affected by the network-side exception of the LTE network.

S102. The MME sends, to an eNodeB, an SRVCC handover request message that carries an identifier of target UE, so that the eNodeB hands over a voice service of the target UE from the LTE network to a CS network.

After determining that an exception occurs on the network side of the LTE network, the MME sends, to the eNodeB, the SRVCC handover request message that carries the identifier of the target UE, so that the eNodeB hands over the voice service of the target UE from the LTE network to the CS network according to the identifier of the target UE that is carried in the received SRVCC handover request message and according to an SRVCC handover procedure in the $3^{rd}$ Generation Partnership Project (3GPP) standard.

According to the voice service handover method provided in this embodiment of the present invention, after determining that an exception occurs on a network side of an LTE network, an MME sends, to an eNodeB, an SRVCC handover request message that carries an identifier of target UE, so that the eNodeB hands over a voice service of the target UE from the LTE network to a CS network. After determining that an exception occurs on the network side of the LTE network, the MME can instruct the eNodeB to hand over the voice service of the target UE from the LTE network to the CS network. Therefore, impact of the network-side exception on the voice service of the UE is avoided, and reliability of the voice service of the UE is improved.

Further, in a first possible implementation manner, that the MME determines that an exception occurs on the network side of the LTE network may be specifically: The MME receives a handover request message sent by the eNodeB and determines that the target UE fails to be handed over from the current eNodeB to a target eNodeB.

The handover request message sent by the eNodeB is used to notify the MME that the target UE needs to be handed over from the current eNodeB to the target eNodeB. The current eNodeB is an eNodeB that is accessed by the target UE currently, that is, the eNodeB that sends the handover request message to the MME.

Further, in a second possible implementation manner, that the MME determines that an exception occurs on the network side of the LTE network may be specifically: The MME receives a connection exception message sent by a first network device.

The connection exception message is used to feed back a result that an exception occurs on a user plane connection, and the connection exception message includes an evolved packet system (EPS) bearer identity of at least one UE that meets a predetermined condition. The UE that meets the predetermined condition is UE whose service transmission is affected after an exception occurs on the user plane connection.

To ensure reliability of a voice service of the UE that meets the predetermined condition, before performing S102, the MME needs to determine the target UE from the UE that meets the predetermined condition. In a possible implementation manner, a process in which the MME determines the target UE is: The MME determines, according to the EPS bearer identity of the UE that meets the predetermined condition, UE whose voice bearer is established on the network side of the LTE network as the target UE. In another possible implementation manner, currently some UEs do not support an SRVCC handover function. Therefore, in order to hand over voice services of the some UEs from the LTE network to the CS network, a process in which the MME determines the target UE is: The MME determines, according to the EPS bearer identity of the UE that meets the predetermined condition, UE whose voice bearer is established on the network side of the LTE network and that supports SRVCC handover as the target UE.

A correspondence between an EPS bearer identity of UE and an EPS bearer of the UE is stored in the MME. The EPS bearer may be a voice bearer. After the MME receives the connection exception message sent by the first network device, the MME may find out, on the network side of the LTE network according to the EPS bearer identity that is included in the connection exception message and that is of the UE that meets the predetermined condition, UE whose EPS bearer corresponds to a quality of service class identifier (QCI) 1, that is, find out, on the network side of the LTE network, UE corresponding to a voice bearer, and determine the UE as the target UE.

Further, in the second possible implementation manner in which the MME determines that an exception occurs on the network side of the LTE network, in a possible implementation manner, the connection exception message received by the MME is sent by the first network device after the first network device detects that an exception occurs on a user plane connection between the first network device and a second network device. The connection exception message includes the EPS bearer identity of the UE that meets the predetermined condition. The UE that meets the predetermined condition is UE that performs service transmission by using the user plane connection between the first network device and the second network device.

Further, in another possible implementation manner, the connection exception message received by the MME is sent by the first network device after the first network device determines that the first network device needs to be restarted. The connection exception message includes the EPS bearer identity of the UE that meets the predetermined condition. The UE that meets the predetermined condition is UE that performs service transmission by using a user plane of the first network device.

It should be noted that, in this embodiment of the present invention, the first network device may be an SGW, an eNodeB, or a PGW. When the first network device is an SGW, the second network device is a PGW. When the first network device is an eNodeB, the second network device is an SGW. That the first network device and the second network device are specifically which network elements is not limited herein in this embodiment of the present invention. Corresponding selection may be performed according to different actual application scenarios.

Figure 3:
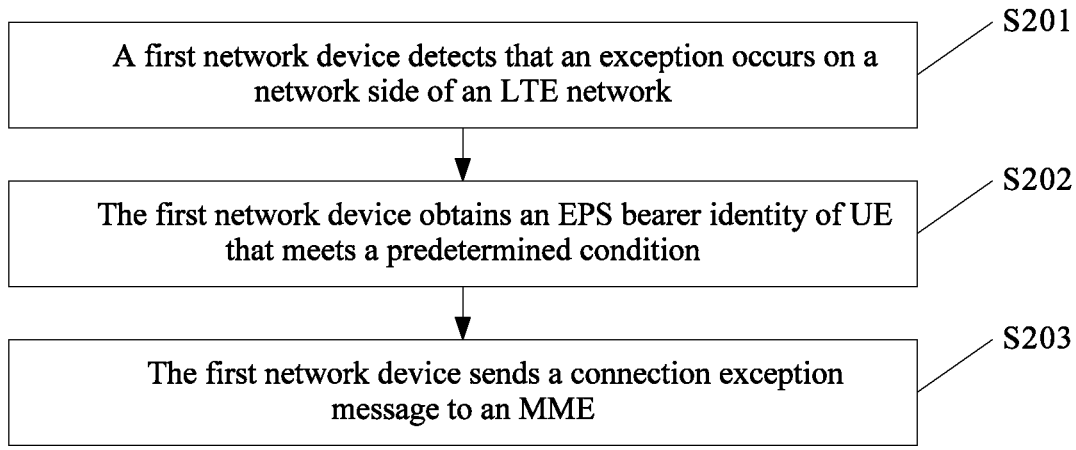
FIG. 3 is a flowchart of a voice service handover method according to another embodiment of the present invention.

Another embodiment of the present invention provides a voice service handover method. As shown in FIG. 3, the method may include the following steps.

S201. A first network device detects that an exception occurs on a network side of an LTE network.

S202. The first network device obtains an EPS bearer identity of UE that meets a predetermined condition.

S203. The first network device sends a connection exception message to an MME.

The connection exception message is used to feed back a result that an exception occurs on a user plane connection, and the connection exception message includes an EPS bearer identity of at least one UE that meets the predetermined condition. After detecting that an exception occurs on the user plane connection, the first network device obtains the EPS bearer identity of the UE that meets the predetermined condition, adds the obtained EPS bearer identity of the UE that meets the predetermined condition to the connection exception message, and sends the connection exception message to the MME.

According to the voice service handover method provided in this embodiment of the present invention, after detecting that an exception occurs on a user plane connection, a first network device obtains an EPS bearer identity of UE that meets a predetermined condition, adds the obtained EPS bearer identity of the UE that meets the predetermined condition to a connection exception message, and sends the connection exception message to an MME, so that the MME determines target UE according to the EPS bearer identity of the UE, and instructs an eNodeB to hand over a voice service of the target UE from an LTE network to a CS network. In this way, impact of the network-side exception on the voice service of the UE is avoided, and reliability of the voice service of the UE is improved.

Further, in a possible implementation manner, that the first network device detects that an exception occurs on the network side of the LTE network may be specifically: The first network device detects that an exception occurs on a user plane connection between the first network device and a second network device.

In this implementation manner, in S202, the UE that meets the predetermined condition is UE that performs service transmission by using the user plane connection between the first network device and the second network device.

Further, in another possible implementation manner, that the first network device detects that an exception occurs on the network side of the LTE network may be specifically: The first network device detects that the first network device needs to be restarted.

In this implementation manner, in S202, the UE that meets the predetermined condition is UE that performs service transmission by using a user plane of the first network device.

It should be noted that, in this embodiment of the present invention, the first network device may be an SGW, an eNodeB, or a PGW. When the first network device is an SGW, the second network device is a PGW. When the first network device is an eNodeB, the second network device is an SGW. That the first network device and the second network device are specifically which network elements is not limited herein in this embodiment of the present invention. Corresponding selection may be performed according to different actual application scenarios.

Figure 4:
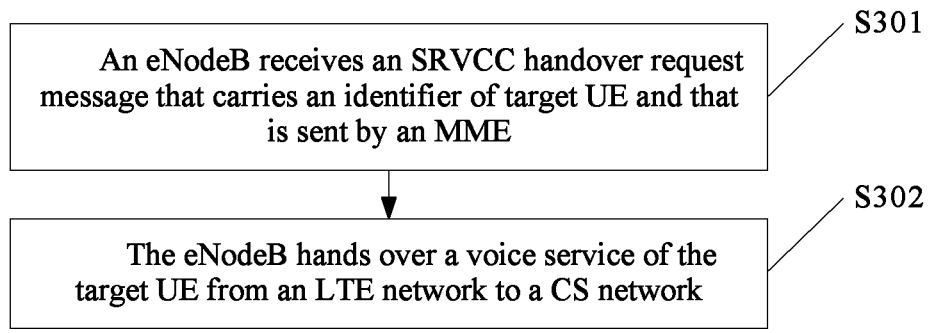
FIG. 4 is a flowchart of a voice service handover method according to another embodiment of the present invention.

Another embodiment of the present invention provides a voice service handover method. As shown in FIG. 4, the method may include the following steps.

S301. An eNodeB receives an SRVCC handover request message that carries an identifier of target UE and that is sent by an MME.

S302. The eNodeB hands over a voice service of the target UE from an LTE network to a CS network.

After receiving the SRVCC handover request message that carries the identifier of the target UE and that is sent by the MME, the eNodeB hands over the voice service of the target UE from the LTE network to the CS network according to the identifier of the target UE that is carried in the SRVCC handover request message and according to an SRVCC handover procedure in the 3GPP standard.

According to the voice service handover method provided in this embodiment of the present invention, after receiving an SRVCC handover request message that carries an identifier of target UE and that is sent by an MME, an eNodeB hands over a voice service of the target UE from an LTE network to a CS network according to the identifier of the target UE that is carried in the SRVCC handover request message. In this way, impact of a network-side exception on the voice service of the UE is avoided, and reliability of the voice service of the UE is improved.

In a first application scenario (the first application scenario is SRVCC handover triggered because the MME determines that the target UE fails to be handed over between eNodeBs), further, before performing S301, the eNodeB sends a handover request message to the MME.

The handover request message sent by the eNodeB is used to notify the MME that the target UE needs to be handed over from the current eNodeB to a target eNodeB. The current eNodeB is an eNodeB that is accessed by the target UE currently, that is, the eNodeB that sends the handover request message to the MME.

Further, to avoid unnecessary handover for the target UE, before performing S302, the eNodeB needs to determine that the eNodeB fails to continue providing the voice service to the target UE.

Further, to ensure reliability of the voice service of the target UE on the CS network, before S302 is performed, in a possible implementation manner, the eNodeB just receives a radio measurement report of the CS network that is sent by the target UE. In this case, S302 may be specifically: The eNodeB hands over the voice service of the target UE from the LTE network to the CS network according to the radio measurement report of the CS network.

Further, in another possible implementation manner, after the eNodeB determines that the eNodeB does not have the CS-network radio measurement report of the target UE, to ensure reliability of the voice service of the target UE on the CS network, the eNodeB needs to send an instruction message to the target UE, so that the target UE reports the radio measurement report of the CS network. After the eNodeB receives the radio measurement report of the CS network that is sent by the target UE, S302 may be specifically: The eNodeB hands over the voice service of the target UE from the LTE network to the CS network according to the radio measurement report of the CS network.

The instruction message is used to instruct the target UE to report the radio measurement report of the CS network.

In a second application scenario (the second application scenario is SRVCC handover triggered because the MME receives a connection exception message), further, to ensure reliability of the voice service of the target UE on the CS network, before S302 is performed, in a possible implementation manner, the eNodeB just receives a radio measurement report of the CS network that is sent by the target UE. In this case, S302 may be specifically: The eNodeB hands over the voice service of the target UE from the LTE network to the CS network according to the radio measurement report of the CS network.

Further, in another possible implementation manner, after the eNodeB determines that the eNodeB does not have the CS-network radio measurement report of the target UE, to ensure reliability of the voice service of the target UE on the CS network, the eNodeB needs to send an instruction message to the target UE, so that the target UE reports the radio measurement report of the CS network. After the eNodeB receives the radio measurement report of the CS network that is sent by the target UE, S302 may be specifically: The eNodeB hands over the voice service of the target UE from the LTE network to the CS network according to the radio measurement report of the CS network.

The instruction message is used to instruct the target UE to report the radio measurement report of the CS network.

Figure 5:
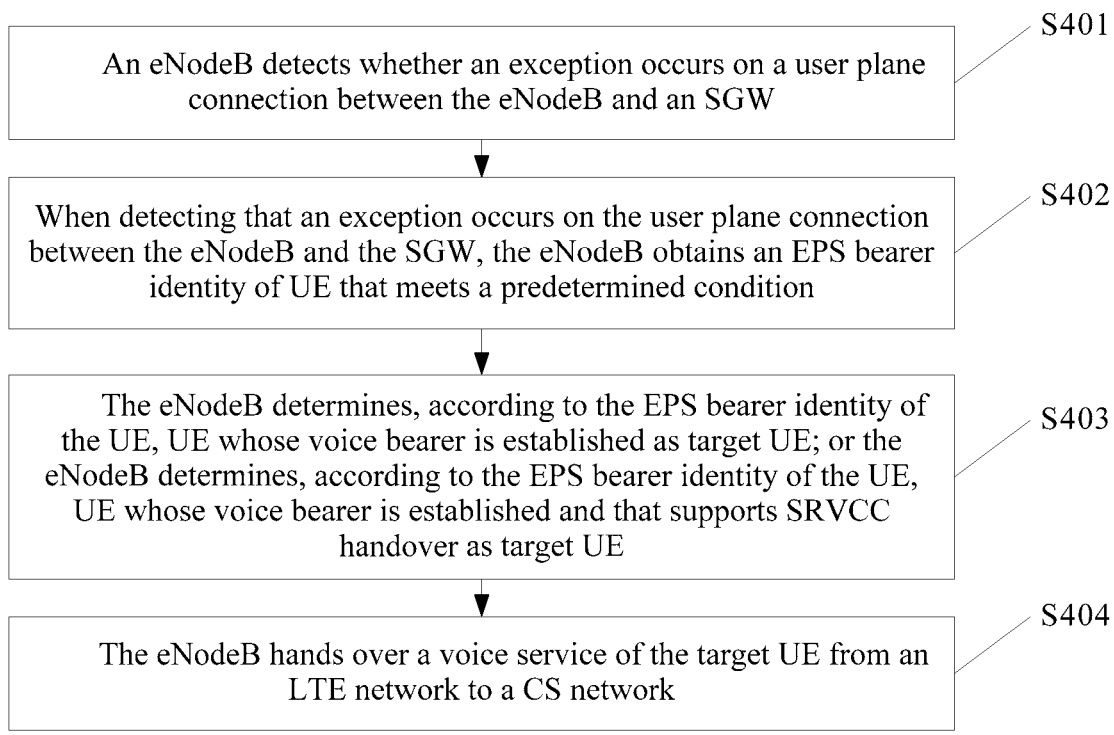
FIG. 5 is a flowchart of a voice service handover method according to another embodiment of the present invention.

Another embodiment of the present invention provides a voice service handover method. As shown in FIG. 5, the method may include the following steps.

S401. An eNodeB detects whether an exception occurs on a user plane connection between the eNodeB and an SGW.

S402. When detecting that an exception occurs on the user plane connection between the eNodeB and the SGW, the eNodeB obtains an EPS bearer identity of UE that meets a predetermined condition.

The UE that meets the predetermined condition is UE that performs service transmission by using the user plane connection between the eNodeB and the SGW.

S403. The eNodeB determines, according to the EPS bearer identity of the UE, UE whose voice bearer is established as target UE; or the eNodeB determines, according to the EPS bearer identity of the UE, UE whose voice bearer is established and that supports SRVCC handover as target UE.

S404. The eNodeB hands over a voice service of the target UE from an LTE network to a CS network.

According to the voice service handover method provided in this embodiment of the present invention, after detecting that an exception occurs on a user plane connection between an eNodeB and an SGW, the eNodeB first obtains an EPS bearer identity of UE that meets a predetermined condition, determines, according to the EPS bearer identity of the UE, UE whose voice bearer is established as target UE, and then hands over a voice service of the determined target UE from an LTE network to a CS network. The eNodeB can hand over the voice service of the UE from the LTE network to the CS network after detecting that an exception occurs on the user plane connection between the eNodeB and the SGW. Therefore, impact of the user-plane-connection exception on the voice service of the UE is avoided, and reliability of the voice service of the UE is improved.

Further, to ensure reliability of the voice service of the target UE on the CS network, before S404 is performed, in a possible implementation manner, the eNodeB just receives a radio measurement report of the CS network that is sent by the target UE. In this case, S404 may be specifically: The eNodeB hands over the voice service of the target UE from the LTE network to the CS network according to the radio measurement report of the CS network.

Further, in another possible implementation manner, after the eNodeB determines that the eNodeB does not have the CS-network radio measurement report of the target UE, to ensure reliability of the voice service of the target UE on the CS network, the eNodeB needs to send an instruction message to the target UE, so that the target UE reports the radio measurement report of the CS network. After the eNodeB receives the radio measurement report of the CS network that is sent by the target UE, S404 may be specifically: The eNodeB hands over the voice service of the target UE from the LTE network to the CS network according to the radio measurement report of the CS network.

The instruction message is used to instruct the target UE to report the radio measurement report of the CS network.

Figure 6:
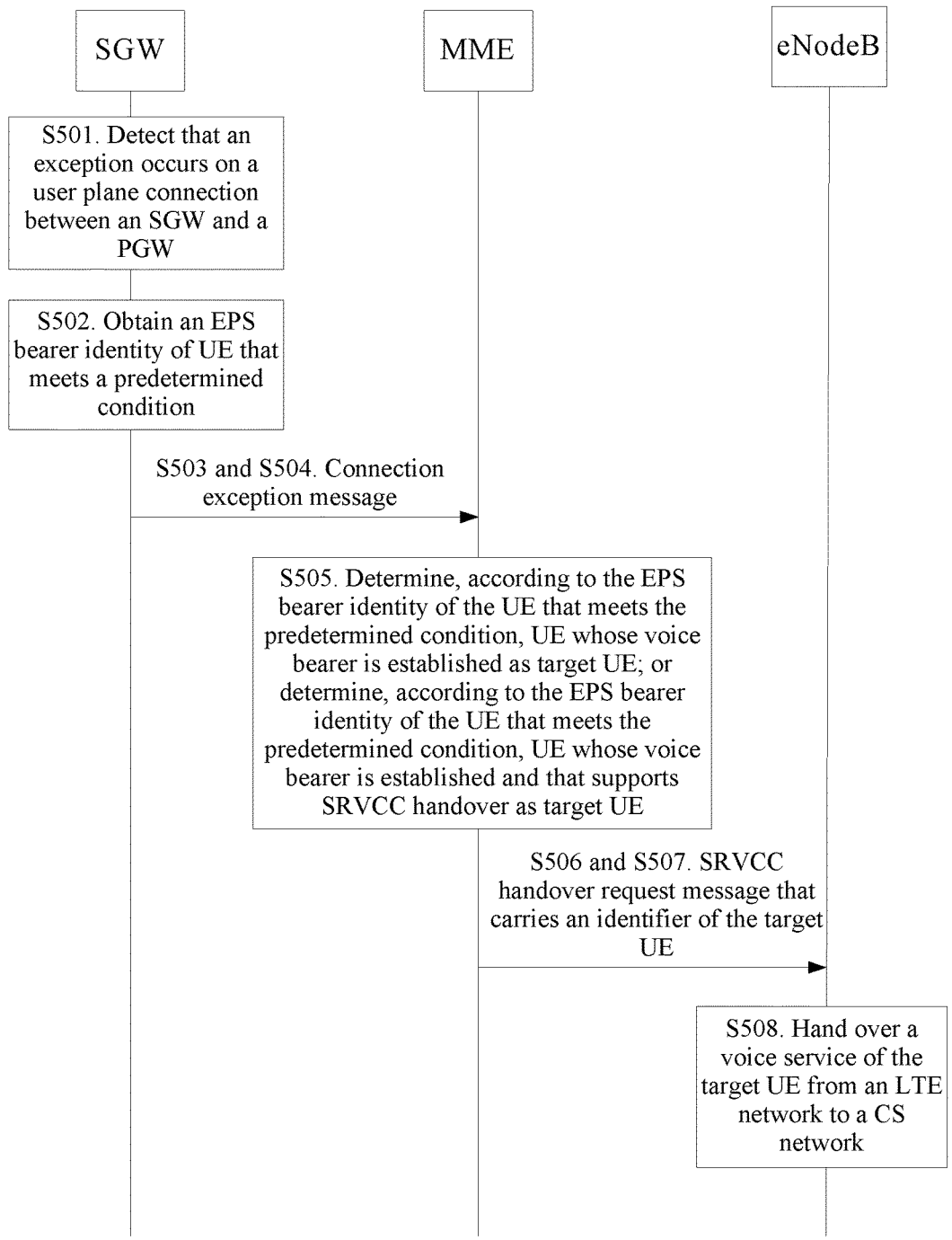
FIG. 6 is a flowchart of a voice service handover method according to another embodiment of the present invention.

Another embodiment of the present invention provides a voice service handover method. For ease of understanding by a person skilled in the art, in this embodiment of the present invention, a specific implementation process of the present invention is described in detail according to different application scenarios. Details are as follows:

In a first application scenario, an example in which a first network device is an SGW and a second network device is a PGW is used for description. A voice service handover method in the application scenario is shown in FIG. 6. Specifically, the method may include the following steps.

S501. The SGW detects that an exception occurs on a user plane connection between the SGW and the PGW.

That an exception occurs on the user plane connection is that the user plane connection is interrupted or congestion occurs on the user plane connection.

When that an exception occurs on the user plane connection is that the user plane connection is interrupted, in a possible implementation manner, a process in which the SGW detects that the user plane connection between the SGW and the PGW is interrupted may include S501a to S501c.

S501a. The SGW obtains a user-plane IP address of the PGW.

The SGW may obtain the user-plane IP address of the PGW in any one of the following manners.

Manner 1: The SGW directly reads the prestored user-plane IP address of the PGW.

The user-plane IP address of the PGW is prestored in the SGW, so that the SGW can directly read the prestored user-plane IP address of the PGW, to obtain the user-plane IP address of the PGW.

Manner 2: The SGW receives in advance the user-plane IP address of the PGW that is sent by the PGW.

In a process in which a voice bearer is established for UE, the PGW may send the user-plane IP address of the PGW to the SGW, so that the SGW obtains the user-plane IP address of the PGW.

S501b. The SGW sends a probe packet to the PGW.

After obtaining the user-plane IP address of the PGW, the SGW sends the probe packet to the PGW according to the obtained user-plane IP address. For example, the SGW may send the probe packet to the PGW in a Bidirectional Forwarding Detection (BFD) manner.

S501c. If the SGW does not receive, within a preset period of time, a response packet sent by the PGW, the SGW detects that the user-plane connection between the SGW and the PGW is interrupted.

When that an exception occurs on the user-plane connection is that congestion occurs on the user plane connection, if the SGW detects that the user plane connection between the SGW and the PGW meets at least one of the following conditions, the SGW determines that congestion occurs on the user plane connection between the SGW and the PGW.

Condition 1: A packet loss rate of the user plane connection is greater than a first preset threshold.

The first preset threshold is a preset critical value for determining, by using the packet loss rate of the user plane connection, that congestion occurs on the user plane connection.

Condition 2: A delay of the user plane connection is greater than a second preset threshold.

The second preset threshold is a preset critical value for determining, by using the delay of the user plane connection, that congestion occurs on the user plane connection.

Condition 3: A jitter of the user plane connection is greater than a third preset threshold.

The third preset threshold is a preset critical value for determining, by using the jitter of the user plane connection, that congestion occurs on the user plane connection.

An example in which the SGW detects that the user plane connection between the SGW and the PGW meets the condition 1 is used to describe a process in which the SGW detects that congestion occurs on the user plane connection between the SGW and the PGW. The process may be specifically: After the SGW detects that transmission wideband utilization of a network interface connected to the PGW exceeds a specific threshold, the SGW sends probe packets to the PGW according to a specific probe interval, and obtains a packet loss rate of the probe packets in a preset period of time by means of statistics collection. If the packet loss rate is greater than the first preset threshold, the SGW determines that congestion occurs on the user plane connection between the SGW and the PGW.

It should be noted that, the first preset threshold, the second preset threshold, and the third preset threshold may be determined by using a mean opinion score (MOS) test. In addition, specific values that are set for the first preset threshold, the second preset threshold, and the third preset threshold are not limited in this embodiment of the present invention, and corresponding setting may be performed according to requirements for actual application scenarios.

S502. The SGW obtains an EPS bearer identity of UE that meets a predetermined condition.

The UE that meets the predetermined condition is UE that performs service transmission by using the user plane connection between the SGW and the PGW. For example, a process in which the SGW obtains the EPS bearer identity of the UE that meets the predetermined condition is: A correspondence between an EPS bearer identity of UE and a user-plane IP address of the PGW is stored in the SGW. In this case, when detecting that an exception occurs on the user plane connection between the SGW and the PGW, the SGW may learn, according to the correspondence that is between an EPS bearer identity of UE and a user-plane IP address of the PGW and that is stored in the SGW, UE to which an EPS bearer identity corresponding to the user-plane IP address of the PGW belongs, that is, learn the UE that performs service transmission by using the user plane connection between the SGW and the PGW.

S503. The SGW sends a connection exception message to an MME.

The connection exception message is used to feed back a result that an exception occurs on the user plane connection between the SGW and the PGW, and the connection exception message includes an EPS bearer identity of at least one UE that meets the predetermined condition. After detecting that an exception occurs on the user plane connection between the SGW and the PGW, the SGW first obtains the EPS bearer identity of the UE that performs service transmission by using the user plane connection between the SGW and the PGW, adds the obtained EPS bearer identity of the UE to the connection exception message, and sends the connection exception message to the MME.

S504. The MME receives the connection exception message sent by the SGW.

S505. The MME determines, according to the EPS bearer identity of the UE that meets the predetermined condition, UE whose voice bearer is established as target UE; or determines, according to the EPS bearer identity of the UE that meets the predetermined condition, UE whose voice bearer is established and that supports SRVCC handover as target UE.

After receiving the connection exception message sent by the SGW, in a possible implementation manner, the MME may determine, according to the EPS bearer identity of the UE that meets the predetermined condition, the UE whose voice bearer is established as the target UE. In another possible implementation manner, currently some UEs do not support an SRVCC handover function. Therefore, in order that an eNodeB can hand over voice services of the some UEs from an LTE network to a CS network, the MME may determine, according to the EPS bearer identity of the UE that meets the predetermined condition, UE whose voice bearer is established and that supports SRVCC handover as the target UE.

The MME may determine, according to the EPS bearer identity that is included in the connection exception message and that is of the UE that meets the predetermined condition, UE whose EPS bearer corresponds to a QCI 1 as the target UE, that is, determine the UE whose voice bearer is established as the target UE.

S506. The MME sends, to an eNodeB, an SRVCC handover request message that carries an identifier of the target UE.

S507. The eNodeB receives the SRVCC handover request message that carries the identifier of the target UE and that is sent by the MME.

S508. The eNodeB hands over a voice service of the target UE from an LTE network to a CS network.

The eNodeB hands over the voice service of the target UE from the LTE network to the CS network according to an SRVCC handover procedure in the 3GPP standard.

To ensure reliability of the voice service of the target UE on the CS network, before S508 is performed, in a possible implementation manner, the eNodeB just receives a radio measurement report of the CS network that is sent by the target UE. In this case, S508 may be specifically: The eNodeB hands over the voice service of the target UE from the LTE network to the CS network according to the radio measurement report of the CS network.

In another possible implementation manner, after the eNodeB determines that the eNodeB does not have the CS-network radio measurement report of the target UE, to ensure reliability of the voice service of the target UE on the CS network, the eNodeB needs to send an instruction message to the target UE, so that the target UE reports the radio measurement report of the CS network. After the eNodeB receives the radio measurement report of the CS network that is sent by the target UE, S508 may be specifically: The eNodeB hands over the voice service of the target UE from the LTE network to the CS network according to the radio measurement report of the CS network. When the eNodeB determines that the eNodeB has the CS-network radio measurement report of the target UE, the eNodeB does not need to send an instruction message to the target UE. In this case, S508 may be specifically: The eNodeB hands over the voice service of the target UE from the LTE network to the CS network according to the radio measurement report of the CS network.

According to the voice service handover method provided in this embodiment of the present invention, after an SGW detects that an exception occurs on a user plane connection between the SGW and a PGW, the SGW sends a connection exception message to an MME, so that after receiving the connection exception message, the MME instructs an eNodeB to hand over a voice service of target UE from an LTE network to a CS network. In this way, impact of the user-plane-connection exception on the voice service of the UE is avoided, and reliability of the voice service of the UE is improved.

Figure 7:
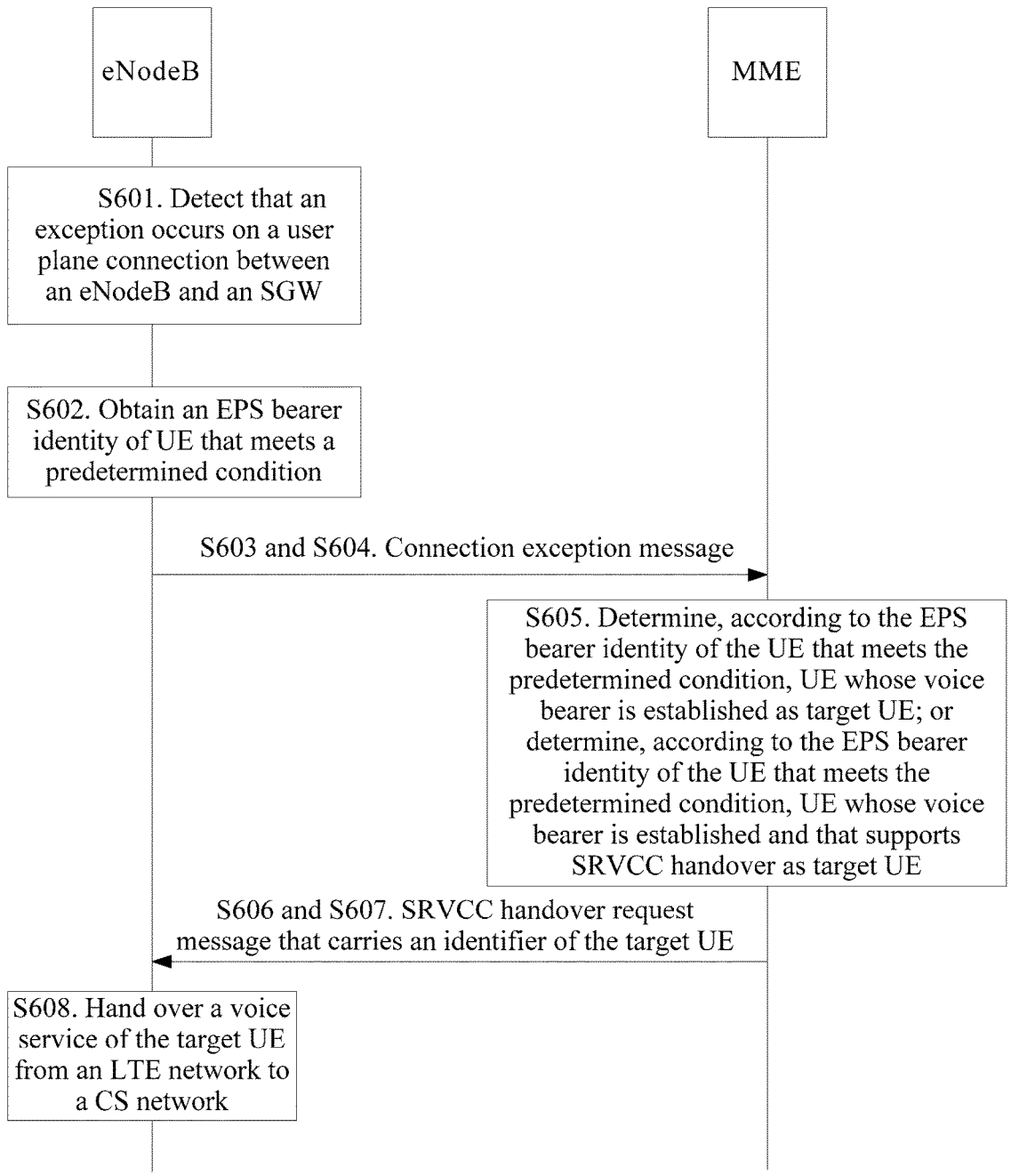
FIG. 7 is a flowchart of another voice service handover method according to another embodiment of the present invention.

In a second application scenario, an example in which a first network device is an eNodeB and a second network device is an SGW is used for description. A voice service handover method in the application scenario is shown in FIG. 7. Specifically, the method may include the following steps.

S601. The eNodeB detects that an exception occurs on a user plane connection between the eNodeB and the SGW.

That an exception occurs on the user plane connection is that the user plane connection is interrupted or congestion occurs on the user plane connection.

S602. The eNodeB obtains an EPS bearer identity of UE that meets a predetermined condition.

The UE that meets the predetermined condition is UE that performs service transmission by using the user plane connection between the eNodeB and the SGW.

S603. The eNodeB sends a connection exception message to an MME.

The connection exception message is used to feed back a result that an exception occurs on the user plane connection between the eNodeB and the SGW, and the connection exception message includes an EPS bearer identity of at least one UE that meets the predetermined condition.

S604. The MME receives the connection exception message sent by the eNodeB.

S605. The MME determines, according to the EPS bearer identity of the UE that meets the predetermined condition, UE whose voice bearer is established as target UE; or determines, according to the EPS bearer identity of the UE that meets the predetermined condition, UE whose voice bearer is established and that supports SRVCC handover as target UE.

S606. The MME sends, to the eNodeB, an SRVCC handover request message that carries an identifier of the target UE.

S607. The eNodeB receives the SRVCC handover request message that carries the identifier of the target UE and that is sent by the MME.

S608. The eNodeB hands over a voice service of the target UE from an LTE network to a CS network.

It should be noted that, for descriptions about relevant content in S601 to S608 in this embodiment of the present invention, refer to descriptions about corresponding content in S501 to S508 in the embodiment of the present invention. Details are not described herein again.

According to the voice service handover method provided in this embodiment of the present invention, after an eNodeB detects that an exception occurs on a user plane connection between the eNodeB and an SGW, the eNodeB may send a connection exception message to an MME, so that after receiving the connection exception message, the MME instructs the eNodeB to hand over a voice service of target UE from an LTE network to a CS network. In this way, impact of the network-side exception on the voice service of the UE is avoided, and reliability of the voice service of the UE is improved.

Figure 8:
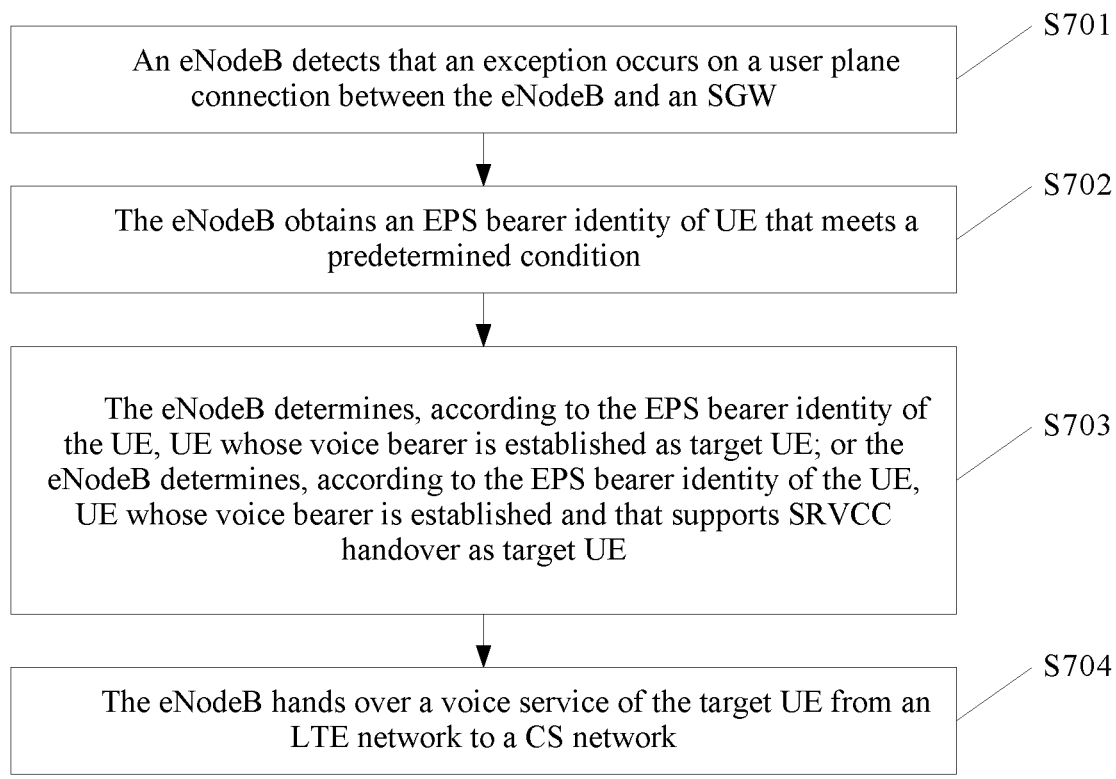
FIG. 8 is a flowchart of another voice service handover method according to another embodiment of the present invention.

In a third application scenario, an example in which a first network device is an eNodeB and a second network device is an SGW is used for description. A voice service handover method in the application scenario is shown in FIG. 8. Specifically, the method may include the following steps.

S701. The eNodeB detects that an exception occurs on a user plane connection between the eNodeB and the SGW.

That an exception occurs on the user plane connection is that the user plane connection is interrupted or congestion occurs on the user plane connection.

S702. The eNodeB obtains an EPS bearer identity of UE that meets a predetermined condition.

The UE that meets the predetermined condition is UE that performs service transmission by using the user plane connection between the eNodeB and the SGW.

S703. The eNodeB determines, according to the EPS bearer identity of the UE, UE whose voice bearer is established as target UE; or the eNodeB determines, according to the EPS bearer identity of the UE, UE whose voice bearer is established and that supports SRVCC handover as target UE.

S704. The eNodeB hands over a voice service of the target UE from an LTE network to a CS network.

It should be noted that, for descriptions about relevant content in S701 to S704 in this embodiment of the present invention, refer to descriptions about corresponding content in S501 to S508 in the embodiment of the present invention. Details are not described herein again.

According to the voice service handover method provided in this embodiment of the present invention, after an eNodeB detects that an exception occurs on a user plane connection between the eNodeB and an SGW, the eNodeB first obtains an EPS bearer identity of UE that meets a predetermined condition, then determines, according to the obtained EPS bearer identity of the UE, UE whose voice bearer is established as target UE, and finally hands over a voice service of the target UE from an LTE network to a CS network. The eNodeB can hand over the voice service of the target UE from the LTE network to the CS network after detecting that an exception occurs on the user plane connection between the eNodeB and the SGW. Therefore, impact of the user-plane-connection exception on the voice service of the UE is avoided, and reliability of the voice service of the UE is improved.

Figure 9:
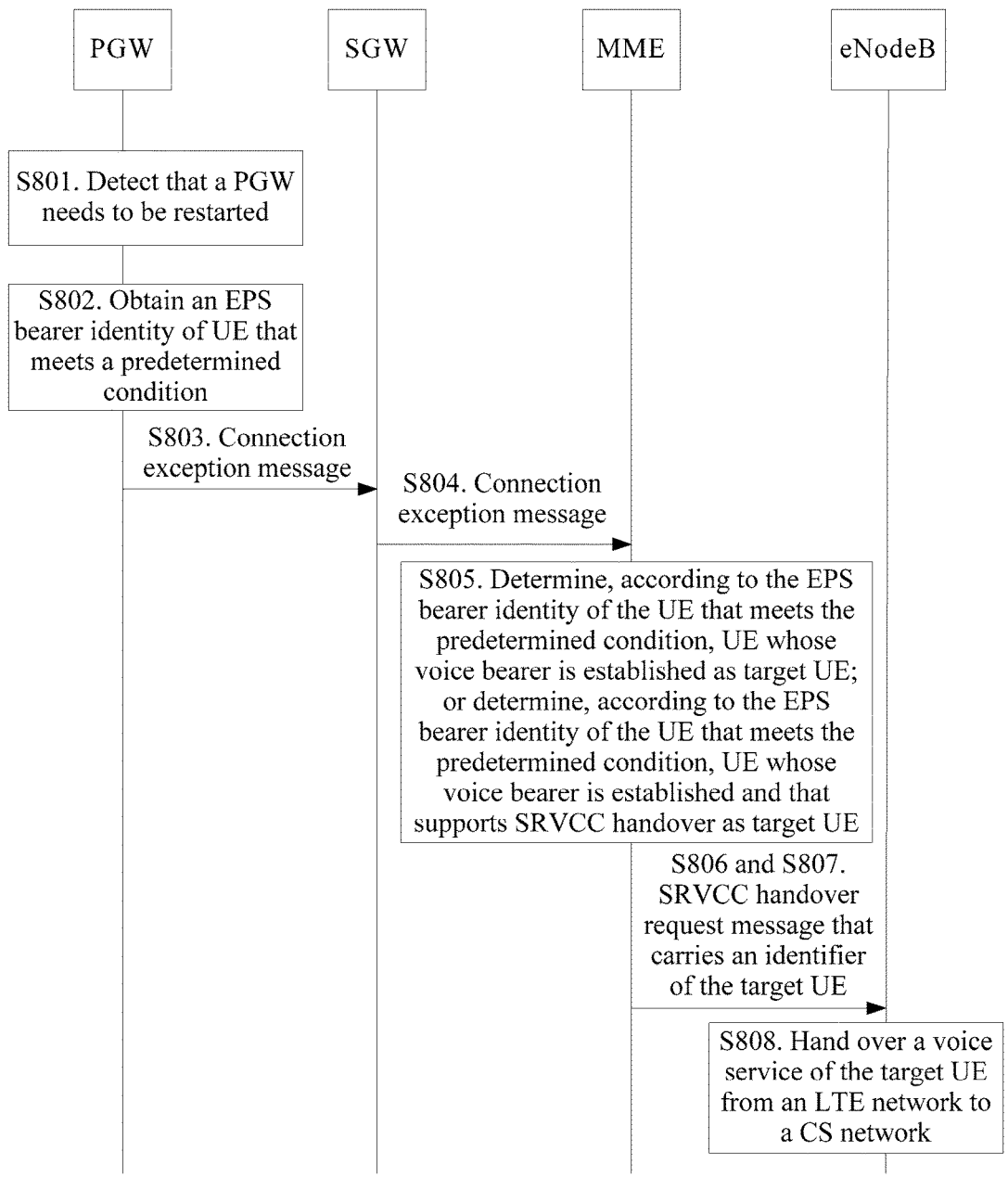
FIG. 9 is a flowchart of another voice service handover method according to another embodiment of the present invention.

In a fourth application scenario, an example in which a first network device is a PGW and the first network device needs to be restarted is used for description. A voice service handover method in the application scenario is shown in FIG. 9. Specifically, the method may include the following steps.

S801. The PGW detects that the PGW needs to be restarted.

S802. The PGW obtains an EPS bearer identity of UE that meets a predetermined condition.

The UE that meets the predetermined condition is UE that performs service transmission by using a user plane of the PGW.

S803. The PGW sends a connection exception message to an SGW.

The connection exception message includes the EPS bearer identity of the UE that meets the predetermined condition. After detecting that the PGW needs to be restarted, the PGW first obtains an EPS bearer identity of UE that performs service transmission by using the user plane of the PGW, adds the obtained EPS bearer identity of the UE to the connection exception message, and sends the connection exception message to the SGW.

S804. The SGW sends the connection exception message to an MME.

S805. The MME determines, according to the EPS bearer identity of the UE that meets the predetermined condition, UE whose voice bearer is established as target UE; or determines, according to the EPS bearer identity of the UE that meets the predetermined condition, UE whose voice bearer is established and that supports SRVCC handover as target UE.

S806. The MME sends, to an eNodeB, an SRVCC handover request message that carries an identifier of the target UE.

S807. The eNodeB receives the SRVCC handover request message that carries the identifier of the target UE and that is sent by the MME.

S808. The eNodeB hands over a voice service of the target UE from an LTE network to a CS network.

It should be noted that, for descriptions about relevant content in S801 to S808 in this embodiment of the present invention, refer to descriptions about corresponding content in S501 to S508 in the embodiment of the present invention. Details are not described herein again.

According to the voice service handover method provided in this embodiment of the present invention, after detecting that a PGW needs to be restarted, the PGW sends a connection exception message to an MME by using an SGW, so that after receiving the connection exception message, the MME instructs an eNodeB to hand over a voice service of target UE from an LTE network to a CS network. In this way, impact of PGW restart on the voice service of the UE is avoided, and reliability of the voice service of the UE is improved.

Figure 10:
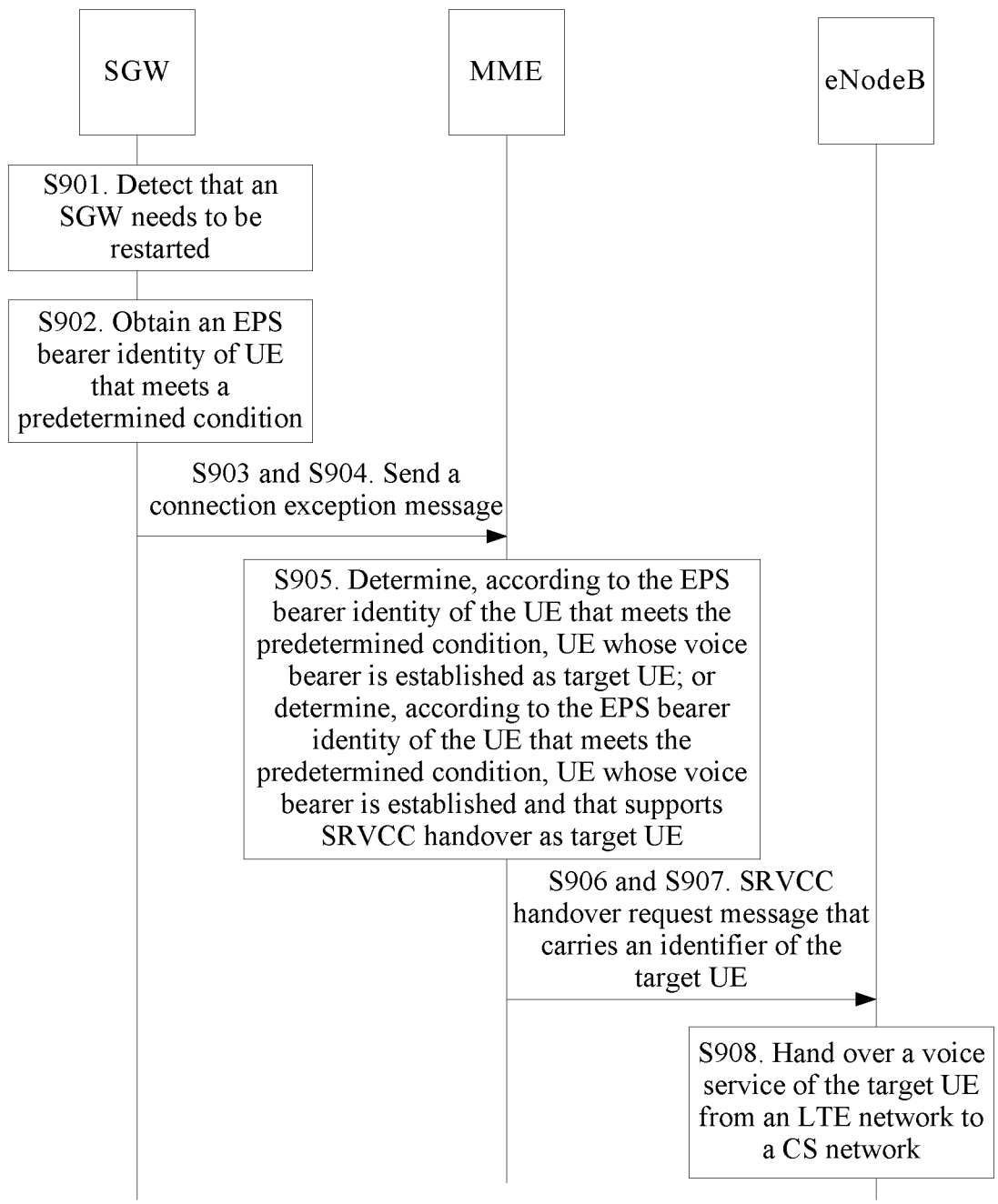
FIG. 10 is a flowchart of another voice service handover method according to another embodiment of the present invention.

In a fifth application scenario, an example in which a first network device is an SGW and the first network device needs to be restarted is used for description. A voice service handover method in the application scenario is shown in FIG. 10. Specifically, the method may include the following steps.

S901. The SGW detects that the SGW needs to be restarted.

S902. The SGW obtains an EPS bearer identity of UE that meets a predetermined condition.

The UE that meets the predetermined condition is UE that performs service transmission by using a user plane of the SGW.

S903. The SGW sends a connection exception message to an MME.

The connection exception message includes the EPS bearer identity of the UE that meets the predetermined condition. After detecting that the SGW needs to be restarted, the SGW first obtains an EPS bearer identity of UE that performs service transmission by using the user plane of the SGW, adds the obtained EPS bearer identity of the UE to the connection exception message, and sends the connection exception message to the MME.

S904. The MME receives the connection exception message sent by the SGW.

S905. The MME determines, according to the EPS bearer identity of the UE that meets the predetermined condition, UE whose voice bearer is established as target UE; or determines, according to the EPS bearer identity of the UE that meets the predetermined condition, UE whose voice bearer is established and that supports SRVCC handover as target UE.

S906. The MME sends, to an eNodeB, an SRVCC handover request message that carries an identifier of the target UE.

S907. The eNodeB receives the SRVCC handover request message that carries the identifier of the target UE and that is sent by the MME.

S908. The eNodeB hands over a voice service of the target UE from an LTE network to a CS network.

It should be noted that, for descriptions about relevant content in S901 to S908 in this embodiment of the present invention, refer to descriptions about corresponding content in S501 to S508 in the embodiment of the present invention. Details are not described herein again.

According to the voice service handover method provided in this embodiment of the present invention, after detecting that an SGW needs to be restarted, the SGW sends a connection exception message to an MME, so that after receiving the connection exception message, the MME instructs an eNodeB to hand over a voice service of target UE from an LTE network to a CS network. In this way, impact of SGW restart on the voice service of the UE is avoided, and reliability of the voice service of the UE is improved.

Figure 11:
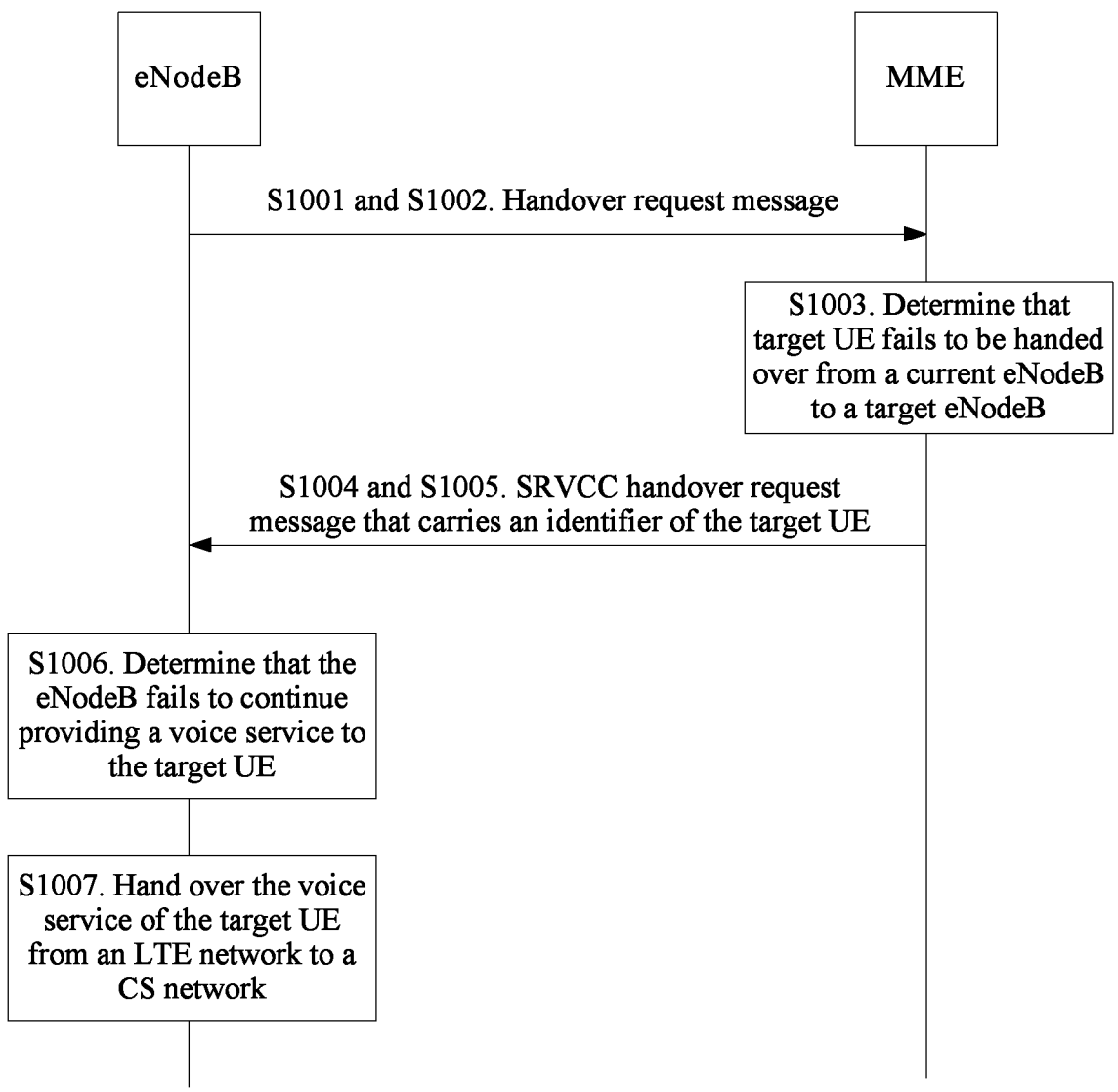
FIG. 11 is a flowchart of another voice service handover method according to another embodiment of the present invention.

In a sixth application scenario, an example in which UE needs to be handed over between eNodeBs is used for description. A voice service handover method in the application scenario is shown in FIG. 11. Specifically, the method may include the following steps.

S1001. An eNodeB sends a handover request message to an MME.

The handover request message is used to notify the MME that target UE needs to be handed over from the current eNodeB (the current eNodeB is an eNodeB that is accessed by the target UE currently, that is, the eNodeB that sends the handover request message to the MME) to a target eNodeB.

S1002. The MME receives the handover request message sent by the eNodeB.

S1003. The MME determines that target UE fails to be handed over from the current eNodeB to a target eNodeB.

For example, when a control plane of the target eNodeB is faulty, because the MME fails to instruct the target eNodeB to perform handover, a user-plane voice bearer fails to be established between the target eNodeB and an SGW, that is, the MME determines that the target UE fails to be handed over from the current eNodeB to the target eNodeB.

S1004. The MME sends, to the eNodeB, an SRVCC handover request message that carries an identifier of the target UE.

S1005. The eNodeB receives the SRVCC handover request message that carries the identifier of the target UE and that is sent by the MME.

S1006. The eNodeB determines that the eNodeB fails to continue providing a voice service to the target UE.

S1007. The eNodeB hands over the voice service of the target UE from an LTE network to a CS network.

It should be noted that, for descriptions about relevant content in S1001 to S1007 in this embodiment of the present invention, refer to descriptions about corresponding content in S501 to S508 in the embodiment of the present invention. Details are not described herein again.

According to the voice service handover method provided in this embodiment of the present invention, after determining that target UE fails to be handed over from a current eNodeB to a target eNodeB, an MME can send an SRVCC handover request message to the current eNodeB, to instruct the current eNodeB to hand over a voice service of the target UE from an LTE network to a CS network. In this way, impact of a network-side exception on the voice service of the UE is avoided, and reliability of the voice service of the UE is improved.

Figure 12:
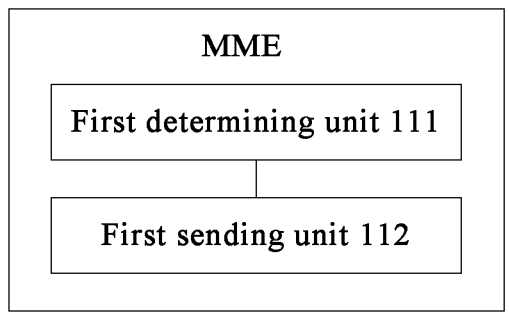
FIG. 12 is a schematic composition diagram of an MME according to another embodiment of the present invention.

Another embodiment of the present invention provides an MME. As shown in FIG. 12, the MME includes a first determining unit 111 and a first sending unit 112.

The first determining unit 111 is configured to determine that an exception occurs on a network side of an LTE network, where a voice bearer of target UE is established on the network side of the LTE network.

The first sending unit 112 is configured to send, to an eNodeB, an SRVCC handover request message that carries an identifier of the target UE, so that the eNodeB hands over a voice service of the target UE from the LTE network to a CS network.

After the first determining unit 111 determines that an exception occurs on the network side of the LTE network, the first sending unit 112 sends, to the eNodeB, the SRVCC handover request message that carries the identifier of the target UE, so that the eNodeB hands over the voice service of the target UE from the LTE network to the CS network according to the identifier of the target UE that is carried in the received SRVCC handover request message and according to an SRVCC handover procedure in the 3GPP standard.

Figure 13:
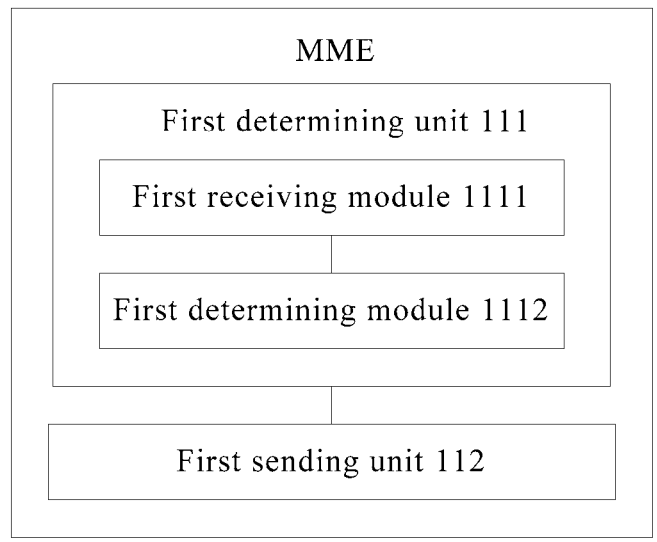
FIG. 13 is a schematic composition diagram of another MME according to another embodiment of the present invention.

In this embodiment of the present invention, further, in a possible implementation manner, as shown in FIG. 13, the first determining unit 111 includes a first receiving module 1111 and a first determining module 1112.

The first receiving module 1111 is configured to receive a handover request message sent by the eNodeB, where the handover request message is used to notify the MME that the target UE needs to be handed over from the eNodeB to a target eNodeB.

The first determining module 1112 is configured to determine that the target UE fails to be handed over from the current eNodeB to the target eNodeB.

The current eNodeB is an eNodeB that is accessed by the target UE currently, that is, the eNodeB that sends the handover request message to the MME.

Figure 14:
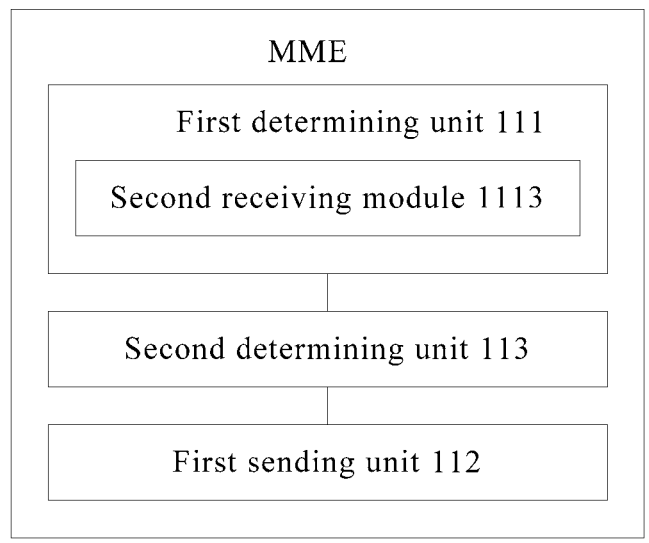
FIG. 14 is a schematic composition diagram of another MME according to another embodiment of the present invention.

In this embodiment of the present invention, further, in another possible implementation manner, as shown in FIG. 14, the first determining unit 111 includes a second receiving module 1113. The MME may further include a second determining unit 113.

The second receiving module 1113 is configured to receive a connection exception message sent by a first network device, where the connection exception message is used to feed back a result that an exception occurs on a user plane connection, and the connection exception message includes an EPS bearer identity of at least one UE that meets a predetermined condition.

The second determining unit 113 is configured to: before the first sending unit 112 sends, to the eNodeB, the SRVCC handover request message that carries the identifier of the target UE, determine, according to the EPS bearer identity of the UE that meets the predetermined condition, UE whose voice bearer is established on the network side of the LTE network as the target UE; or determine, according to the EPS bearer identity of the UE that meets the predetermined condition, UE whose voice bearer is established on the network side of the LTE network and that supports SRVCC handover as the target UE.

In this embodiment of the present invention, further, the second receiving module 1113 is specifically configured to receive the connection exception message that is sent by the first network device after the first network device detects that an exception occurs on a user plane connection between the first network device and a second network device.

The connection exception message includes the EPS bearer identity of the UE that meets the predetermined condition. The UE that meets the predetermined condition is UE that performs service transmission by using the user plane connection between the first network device and the second network device.

In this embodiment of the present invention, further, the second receiving module 1113 is specifically configured to receive the connection exception message that is sent by the first network device after the first network device determines that the first network device needs to be restarted.

The connection exception message includes the EPS bearer identity of the UE that meets the predetermined condition.

The UE that meets the predetermined condition is UE that performs service transmission by using a user plane of the first network device.

In this embodiment of the present invention, further, that an exception occurs on the user plane connection includes either of the following: the user plane connection is interrupted or congestion occurs on the user plane connection.

In this embodiment of the present invention, further, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold.

The first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

It should be noted that, in this embodiment of the present invention, the first network device may be an SGW, an eNodeB, or a PGW. When the first network device is an SGW, the second network device is a PGW. When the first network device is an eNodeB, the second network device is an SGW. That the first network device and the second network device are specifically which network elements is not limited herein in this embodiment of the present invention. Corresponding selection may be performed according to different actual application scenarios.

According to the MME provided in this embodiment of the present invention, after determining that an exception occurs on a network side of an LTE network, the MME sends, to an eNodeB, an SRVCC handover request message that carries an identifier of target UE, so that the eNodeB hands over a voice service of the target UE from an LTE network to a CS network. After determining that an exception occurs on the network side of the LTE network, the MME can instruct the eNodeB to hand over the voice service of the target UE from the LTE network to the CS network. Therefore, impact of the network-side exception on the voice service of the UE is avoided, and reliability of the voice service of the UE is improved.

Figure 15:
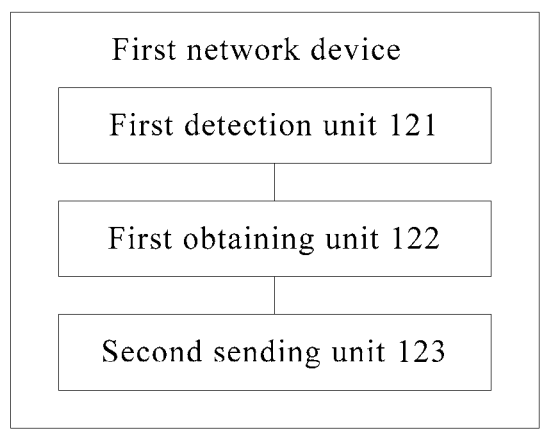
FIG. 15 is a schematic composition diagram of a first network device according to another embodiment of the present invention.

Another embodiment of the present invention provides a first network device. As shown in FIG. 15, the first network device includes a first detection unit 121, a first obtaining unit 122, and a second sending unit 123.

The first detection unit 121 is configured to detect that an exception occurs on a network side of a Long Term Evolution LTE network.

The first obtaining unit 122 is configured to obtain an EPS bearer identity of at least one UE that meets a predetermined condition.

The second sending unit 123 is configured to send a connection exception message to an MME.

The connection exception message is used to feed back a result that an exception occurs on a user plane connection, and the connection exception message includes the EPS bearer identity of the at least one UE that meets the predetermined condition.

In this embodiment of the present invention, further, the first detection unit 121 is specifically configured to detect that an exception occurs on a user plane connection between the first network device and a second network device.

The UE that meets the predetermined condition is UE that performs service transmission by using the user plane connection between the first network device and the second network device.

In this embodiment of the present invention, further, the first detection unit 121 is specifically configured to detect that the first network device needs to be restarted.

The UE that meets the predetermined condition is UE that performs service transmission by using a user plane of the first network device.

In this embodiment of the present invention, further, that an exception occurs on the user plane connection includes either of the following: the user plane connection is interrupted or congestion occurs on the user plane connection.

In this embodiment of the present invention, further, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold.

The first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

It should be noted that, in this embodiment of the present invention, the first network device may be an SGW, an eNodeB, or a PGW. When the first network device is an SGW, the second network device is a PGW. When the first network device is an eNodeB, the second network device is an SGW. That the first network device and the second network device are specifically which network elements is not limited herein in this embodiment of the present invention. Corresponding selection may be performed according to different actual application scenarios.

According to the first network device provided in this embodiment of the present invention, after detecting that an exception occurs on a user plane connection, the first network device obtains an EPS bearer identity of UE that meets a predetermined condition, adds the obtained EPS bearer identity of the UE that meets the predetermined condition to a connection exception message, and sends the connection exception message to an MME, so that the MME determines target UE according to the EPS bearer identity of the UE, and instructs an eNodeB to hand over a voice service of the target UE from an LTE network to a CS network. In this way, impact of the network-side exception on the voice service of the UE is avoided, and reliability of the voice service of the UE is improved.

Figure 16:
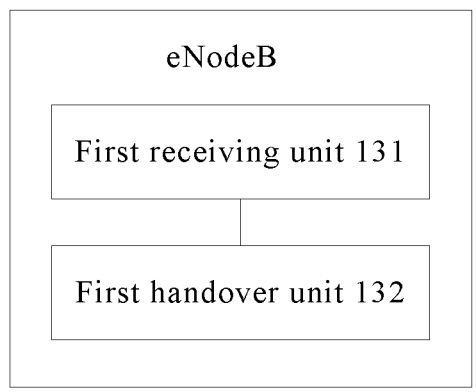
FIG. 16 is a schematic composition diagram of an eNodeB according to another embodiment of the present invention.

Another embodiment of the present invention provides an eNodeB. As shown in FIG. 16, the eNodeB includes a first receiving unit 131 and a first handover unit 132.

The first receiving unit 131 is configured to receive an SRVCC handover request message that carries an identifier of target UE and that is sent by an MME.

The first handover unit 132 is configured to hand over a voice service of the target UE that is received by the first receiving unit 131 from an LTE network to a CS network.

Figure 17:
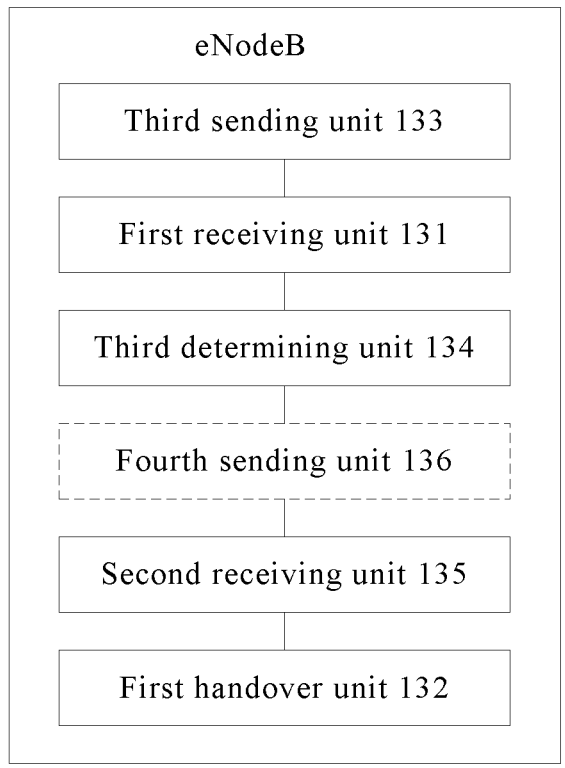
FIG. 17 is a schematic composition diagram of another eNodeB according to another embodiment of the present invention.

In this embodiment of the present invention, as shown in FIG. 17, the eNodeB further includes a third sending unit 133.

The third sending unit 133 is configured to send a handover request message to the MME before the first receiving unit 131 receives the SRVCC handover request message that carries the identifier of the target UE and that is sent by the MME, where the handover request message is used to notify the MME that the target UE needs to be handed over from the current eNodeB to a target eNodeB.

The current eNodeB is an eNodeB that is accessed by the target UE currently, that is, the eNodeB that sends the handover request message to the MME.

In this embodiment of the present invention, the eNodeB further includes a third determining unit 134.

The third determining unit 134 is configured to: before the first handover unit 132 hands over the voice service of the target UE from the LTE network to the CS network, determine that the eNodeB fails to continue providing the voice service to the target UE.

In this embodiment of the present invention, the eNodeB further includes a second receiving unit 135, configured to: before the first handover unit 132 hands over the voice service of the target UE from the LTE network to the CS network, receive a radio measurement report of the CS network that is sent by the target UE.

The first handover unit 132 is specifically configured to hand over the voice service of the target UE from the LTE network to the CS network according to the radio measurement report of the CS network that is received by the second receiving unit 135.

In this embodiment of the present invention, the eNodeB further includes a fourth sending unit 136, configured to send an instruction message to the target UE before the second receiving unit 135 receives the radio measurement report of the CS network that is sent by the target UE, where the instruction message is used to instruct the target UE to report the radio measurement report of the CS network.

According to the eNodeB provided in this embodiment of the present invention, after receiving an SRVCC handover request message that carries an identifier of target UE and that is sent by an MME, the eNodeB hands over a voice service of the target UE from an LTE network to a CS network according to the identifier of the target UE that is carried in the SRVCC handover request message. In this way, impact of a network-side exception on the voice service of the UE is avoided, and reliability of the voice service of the UE is improved.

Figure 18:
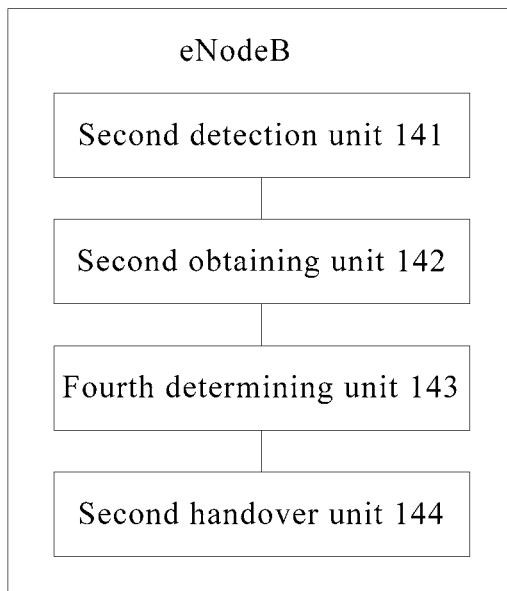
FIG. 18 is a schematic composition diagram of an eNodeB according to another embodiment of the present invention.

Another embodiment of the present invention provides an eNodeB. As shown in FIG. 18, the eNodeB includes a second detection unit 141, a second obtaining unit 142, a fourth determining unit 143, and a second handover unit 144.

The second detection unit 141 is configured to detect whether an exception occurs on a user plane connection between the eNodeB and an SGW.

The second obtaining unit 142 is configured to: when the second detection unit 141 detects that an exception occurs on the user plane connection between the eNodeB and the SGW, obtain an EPS bearer identity of UE that meets a predetermined condition, where the UE that meets the predetermined condition is UE that performs service transmission by using the user plane connection between the eNodeB and the SGW.

The fourth determining unit 143 is configured to: determine, according to the EPS bearer identity of the UE that is obtained by the second obtaining unit 142, UE whose voice bearer is established as target UE; or determine, according to the EPS bearer identity of the UE that is obtained by the second obtaining unit 142, UE whose voice bearer is established and that supports SRVCC handover as target UE.

The second handover unit 144 is configured to hand over a voice service of the target UE determined by the fourth determining unit 143 from an LTE network to a CS network.

Figure 19:
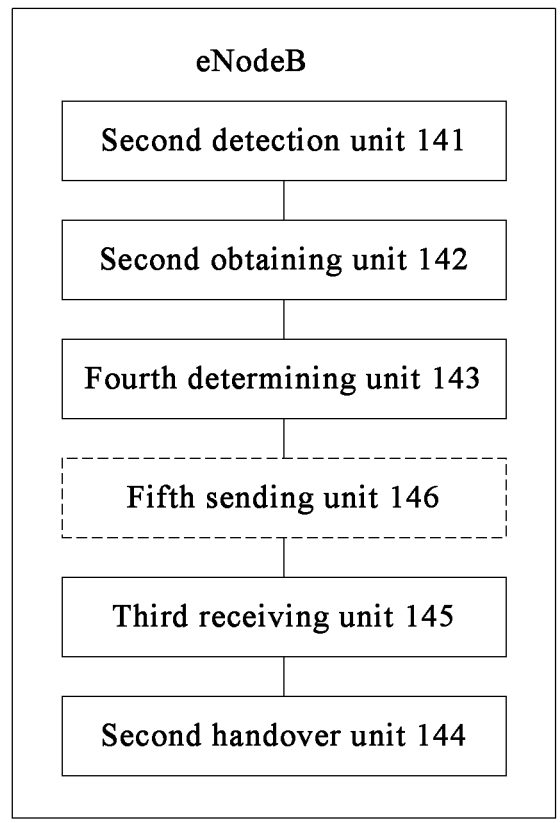
FIG. 19 is a schematic composition diagram of another eNodeB according to another embodiment of the present invention.

In this embodiment of the present invention, as shown in FIG. 19, the eNodeB further includes a third receiving unit 145.

The third receiving unit 145 is configured to: before the second handover unit 144 hands over the voice service of the target UE from the LTE network to the CS network, receive a radio measurement report of the CS network that is sent by the target UE.

The second handover unit 144 is specifically configured to hand over the voice service of the target UE from the LTE network to the CS network according to the radio measurement report of the CS network that is received by the third receiving unit 145.

In this embodiment of the present invention, the eNodeB further includes a fifth sending unit 146.

The fifth sending unit 146 is configured to send an instruction message to the target UE before the third receiving unit 145 receives the radio measurement report sent by the target UE, where the instruction message is used to instruct the target UE to report the radio measurement report of the CS network.

In this embodiment of the present invention, further, that an exception occurs on the user plane connection includes either of the following: the user plane connection is interrupted or congestion occurs on the user plane connection.

In this embodiment of the present invention, further, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold.

The first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to the eNodeB provided in this embodiment of the present invention, after detecting that an exception occurs on a user plane connection between the eNodeB and an SGW, the eNodeB first obtains an EPS bearer identity of UE that meets a predetermined condition, determines, according to the EPS bearer identity of the UE, UE whose voice bearer is established as target UE, and then hands over a voice service of the determined target UE from an LTE network to a CS network. The eNodeB can hand over the voice service of the UE from the LTE network to the CS network after detecting that an exception occurs on the user plane connection between the eNodeB and the SGW. Therefore, impact of the user-plane-connection exception on the voice service of the UE is avoided, and reliability of the voice service of the UE is improved.

Figure 20:
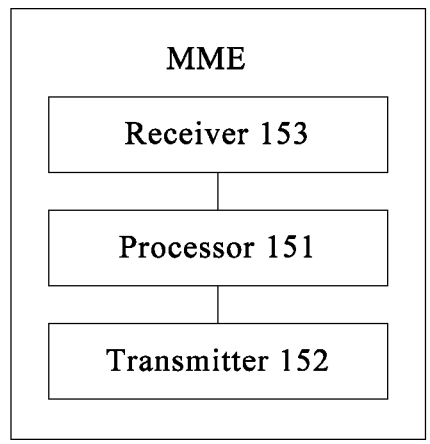
FIG. 20 is a schematic composition diagram of an MME according to another embodiment of the present invention.

Another embodiment of the present invention provides an MME. As shown in FIG. 20, the MME includes a processor 151 and a transmitter 152.

The processor 151 is configured to determine that an exception occurs on a network side of an LTE network, where a voice bearer of target UE is established on the network side of the LTE network.

The transmitter 152 is configured to send, to an eNodeB, an SRVCC handover request message that carries an identifier of the target UE, so that the eNodeB hands over a voice service of the target UE from the LTE network to a CS network.

After the processor 151 determines that an exception occurs on the network side of the LTE network, the transmitter 152 sends, to the eNodeB, the SRVCC handover request message that carries the identifier of the target UE, so that the eNodeB hands over the voice service of the target UE from the LTE network to the CS network according to the identifier of the target UE that is carried in the received SRVCC handover request message and according to an SRVCC handover procedure in the 3GPP standard.

In this embodiment of the present invention, the MME further includes a receiver 153.

The receiver 153 is configured to receive a handover request message sent by the eNodeB, where the handover request message is used to notify the MME that the target UE needs to be handed over from the current eNodeB to a target eNodeB.

The current eNodeB is an eNodeB that is accessed by the target UE currently, that is, the eNodeB that sends the handover request message to the MME.

The processor 151 is specifically configured to determine that the target UE fails to be handed over from the eNodeB to the target eNodeB.

In this embodiment of the present invention, the receiver 153 is further configured to receive a connection exception message sent by a first network device, where the connection exception message is used to feed back a result that an exception occurs on a user plane connection, and the connection exception message includes an EPS bearer identity of at least one UE that meets a predetermined condition.

The processor 151 is further configured to: before the transmitter 152 sends, to the eNodeB, the SRVCC handover request message that carries the identifier of the target UE, determine, according to the EPS bearer identity of the UE that meets the predetermined condition, UE whose voice bearer is established on the network side of the LTE network as the target UE; or determine, according to the EPS bearer identity of the UE that meets the predetermined condition, UE whose voice bearer is established on the network side of the LTE network and that supports SRVCC handover as the target UE.

In this embodiment of the present invention, further, the receiver 153 is specifically configured to receive the connection exception message that is sent by the first network device after the first network device detects that an exception occurs on a user plane connection between the first network device and a second network device.

The connection exception message includes the EPS bearer identity of the UE that meets the predetermined condition. The UE that meets the predetermined condition is UE that performs service transmission by using the user plane connection between the first network device and the second network device.

In this embodiment of the present invention, further, the receiver 153 is specifically configured to receive the connection exception message that is sent by the first network device after the first network device determines that the first network device needs to be restarted.

The connection exception message includes the EPS bearer identity of the UE that meets the predetermined condition.

The UE that meets the predetermined condition is UE that performs service transmission by using a user plane of the first network device.

In this embodiment of the present invention, further, that an exception occurs on the user plane connection includes either of the following: the user plane connection is interrupted or congestion occurs on the user plane connection.

In this embodiment of the present invention, further, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold.

The first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

It should be noted that, in this embodiment of the present invention, the first network device may be an SGW, an eNodeB, or a PGW. When the first network device is an SGW, the second network device is a PGW. When the first network device is an eNodeB, the second network device is an SGW. That the first network device and the second network device are specifically which network elements is not limited herein in this embodiment of the present invention. Corresponding selection may be performed according to different actual application scenarios.

According to the MME provided in this embodiment of the present invention, after determining that an exception occurs on a network side of an LTE network, the MME sends, to an eNodeB, an SRVCC handover request message that carries an identifier of target UE, so that the eNodeB hands over a voice service of the target UE from an LTE network to a CS network. After determining that an exception occurs on the network side of the LTE network, the MME can instruct the eNodeB to hand over the voice service of the target UE from the LTE network to the CS network. Therefore, impact of the network-side exception on the voice service of the UE is avoided, and reliability of the voice service of the UE is improved.

Figure 21:
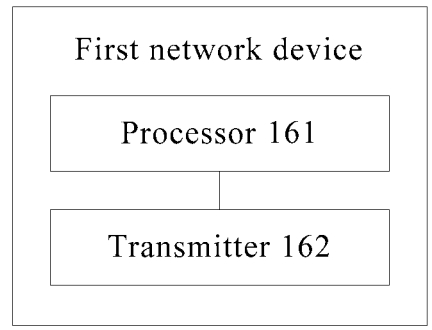
FIG. 21 is a schematic composition diagram of a first network device according to another embodiment of the present invention.

Another embodiment of the present invention provides a first network device. As shown in FIG. 21, the first network device includes a processor 161 and a transmitter 162.

The processor 161 is configured to detect that an exception occurs on a network side of an LTE network.

The processor 161 is further configured to obtain an EPS bearer identity of at least one UE that meets a predetermined condition.

The transmitter 162 is configured to send a connection exception message to an MME.

The connection exception message is used to feed back a result that an exception occurs on a user plane connection, and the connection exception message includes the EPS bearer identity of the at least one UE that meets the predetermined condition.

In this embodiment of the present invention, further, the processor 161 is specifically configured to detect that an exception occurs on a user plane connection between the first network device and a second network device.

The UE that meets the predetermined condition is UE that performs service transmission by using the user plane connection between the first network device and the second network device.

In this embodiment of the present invention, further, the processor 161 is specifically configured to detect that the first network device needs to be restarted.

The UE that meets the predetermined condition is UE that performs service transmission by using a user plane of the first network device.

In this embodiment of the present invention, further, that an exception occurs on the user plane connection includes either of the following: the user plane connection is interrupted or congestion occurs on the user plane connection.

In this embodiment of the present invention, further, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold.

The first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

It should be noted that, in this embodiment of the present invention, the first network device may be an SGW, an eNodeB, or a PGW. When the first network device is an SGW, the second network device is a PGW. When the first network device is an eNodeB, the second network device is an SGW. That the first network device and the second network device are specifically which network elements is not limited herein in this embodiment of the present invention. Corresponding selection may be performed according to different actual application scenarios.

According to the first network device provided in this embodiment of the present invention, after detecting that an exception occurs on a user plane connection, the first network device obtains an EPS bearer identity of UE that meets a predetermined condition, adds the obtained EPS bearer identity of the UE that meets the predetermined condition to a connection exception message, and sends the connection exception message to an MME, so that the MME determines target UE according to the EPS bearer identity of the UE, and instructs an eNodeB to hand over a voice service of the target UE from an LTE network to a CS network. In this way, impact of the network-side exception on the voice service of the UE is avoided, and reliability of the voice service of the UE is improved.

Figure 22:
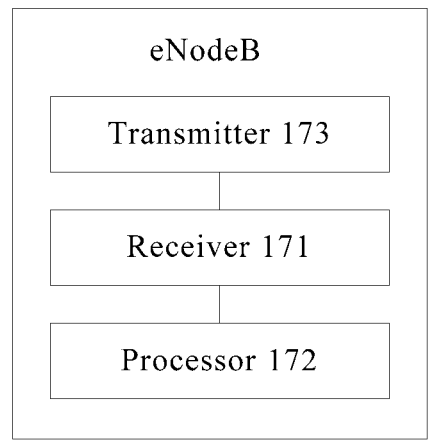
FIG. 22 is a schematic composition diagram of an eNodeB according to another embodiment of the present invention.

Another embodiment of the present invention provides an eNodeB. As shown in FIG. 22, the eNodeB includes a receiver 171 and a processor 172.

The receiver 171 is configured to receive an SRVCC handover request message that carries an identifier of target UE and that is sent by an MME.

The processor 172 is configured to hand over a voice service of the target UE from an LTE network to a CS network.

In this embodiment of the present invention, the eNodeB further includes a transmitter 173.

The transmitter 173 is configured to send a handover request message to the MME before the receiver 171 receives the SRVCC handover request message that carries the identifier of the target UE and that is sent by the MME, where the handover request message is used to notify the MME that the target UE needs to be handed over from the current eNodeB to a target eNodeB.

The current eNodeB is an eNodeB that is accessed by the target UE currently, that is, the eNodeB that sends the handover request message to the MME.

In this embodiment of the present invention, the processor 172 is further configured to: before handing over the voice service of the target UE from the LTE network to the CS network, determine that the eNodeB fails to continue providing the voice service to the target UE.

In this embodiment of the present invention, the receiver 171 is further configured to: before the processor 172 hands over the voice service of the target UE from the LTE network to the CS network, receive a radio measurement report of the CS network that is sent by the target UE.

The processor 172 is specifically configured to hand over the voice service of the target UE from the LTE network to the CS network according to the radio measurement report of the CS network.

In this embodiment of the present invention, the transmitter 173 is further configured to send an instruction message to the target UE before the receiver 171 receives the radio measurement report of the CS network that is sent by the target UE, where the instruction message is used to instruct the target UE to report the radio measurement report of the CS network.

According to the eNodeB provided in this embodiment of the present invention, after receiving an SRVCC handover request message that carries an identifier of target UE and that is sent by an MME, the eNodeB hands over a voice service of the target UE from an LTE network to a CS network according to the identifier of the target UE that is carried in the SRVCC handover request message. In this way, impact of a network-side exception on the voice service of the UE is avoided, and reliability of the voice service of the UE is improved.

Figure 23:
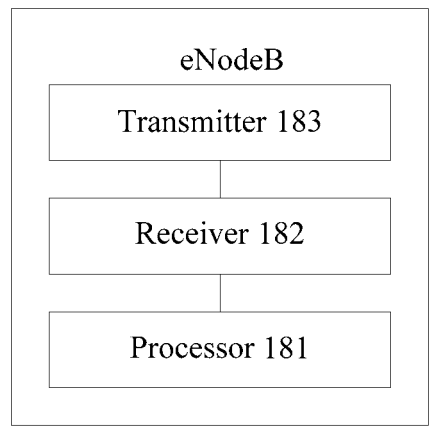
FIG. 23 is a schematic composition diagram of an eNodeB according to another embodiment of the present invention.

Another embodiment of the present invention provides an eNodeB. As shown in FIG. 23, the eNodeB includes a processor 181.

The processor 181 is configured to detect whether an exception occurs on a user plane connection between the eNodeB and an SGW.

The processor 181 is further configured to: when detecting that an exception occurs on the user plane connection between the eNodeB and the SGW, obtain an EPS bearer identity of UE that meets a predetermined condition, where the UE that meets the predetermined condition is UE that performs service transmission by using the user plane connection between the eNodeB and the SGW.

The processor 181 is further configured to: determine, according to the obtained EPS bearer identity of the UE, UE whose voice bearer is established as target UE; or determine, according to the obtained EPS bearer identity of the UE, UE whose voice bearer is established and that supports SRVCC handover as target UE.

The processor 181 is further configured to hand over a voice service of the determined target UE from an LTE network to a CS network.

In this embodiment of the present invention, the eNodeB further includes a receiver 182.

The receiver 182 is configured to: before the processor 181 hands over the voice service of the target UE from the LTE network to the CS network, receive a radio measurement report of the CS network that is sent by the target UE.

The processor 181 is specifically configured to hand over the voice service of the target UE from the LTE network to the CS network according to the radio measurement report of the CS network that is received by the receiver.

In this embodiment of the present invention, the eNodeB further includes a transmitter 183.

The transmitter 183 is configured to send an instruction message to the target UE before the receiver 182 receives the radio measurement report sent by the target UE, where the instruction message is used to instruct the target UE to report the radio measurement report of the CS network.

In this embodiment of the present invention, further, that an exception occurs on the user plane connection includes either of the following: the user plane connection is interrupted or congestion occurs on the user plane connection.

In this embodiment of the present invention, further, that congestion occurs on the user plane connection meets at least one of the following conditions: a packet loss rate of the user plane connection is greater than a first preset threshold; a delay of the user plane connection is greater than a second preset threshold; or a jitter of the user plane connection is greater than a third preset threshold.

The first preset threshold is a preset critical value for determining, by using the packet loss rate of the user plane connection, that congestion occurs on the user plane connection, the second preset threshold is a preset critical value for determining, by using the delay of the user plane connection, that congestion occurs on the user plane connection, and the third preset threshold is a preset critical value for determining, by using the jitter of the user plane connection, that congestion occurs on the user plane connection.

According to the eNodeB provided in this embodiment of the present invention, after detecting that an exception occurs on a user plane connection between the eNodeB and an SGW, the eNodeB first obtains an EPS bearer identity of UE that meets a predetermined condition, determines, according to the EPS bearer identity of the UE, UE whose voice bearer is established as target UE, and then hands over a voice service of the determined target UE from an LTE network to a CS network. The eNodeB can hand over the voice service of the UE from the LTE network to the CS network after detecting that an exception occurs on the user plane connection between the eNodeB and the SGW. Therefore, impact of the user-plane-connection exception on the voice service of the UE is avoided, and reliability of the voice service of the UE is improved.

The foregoing descriptions about implementation manners allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the conventional art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the embodiments of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A voice service handover method, comprising:
determining, by a mobility management entity (MME), that an exception occurs on a network side of a Long Term Evolution (LTE) network, wherein a voice bearer of a target user equipment (UE) is established on the network side of the LTE network; and
sending, by the MME to an evolved NodeB (eNodeB), a single radio voice call continuity (SRVCC) handover request message that carries an identifier of the target UE, to enable the eNodeB to hand over a voice service of the target UE from the LTE network to a circuit switched (CS) network, wherein the determining that the exception occurs on the network side of the LTE network comprises:
receiving, by the MME, a handover request message sent by the eNodeB, wherein the handover request message is used to notify the MME that the target UE needs to be handed over from the eNodeB to a target eNodeB; and
determining, by the MME, that the target UE fails to be handed over from the eNodeB to the target eNodeB.

2. A voice service handover method, comprising:
determining, by a mobility management entity (MME), that an exception occurs on a network side of a Long Term Evolution (LTE) network, wherein a voice bearer of a target user equipment (UE) is established on the network side of the LTE network; and
sending, by the MME to an evolved NodeB (eNodeB), a single radio voice call continuity (SRVCC) handover request message that carries an identifier of the target UE, to enable the eNodeB to hand over a voice service of the target UE from the LTE network to a circuit switched (CS) network, wherein the determining that the exception occurs on the network side of the LTE network comprises:
receiving, by the MME, a connection exception message sent by a first network device, wherein the connection exception message is used to feed back a result that an exception occurs on a user plane connection, and the connection exception message comprises an evolved packet system (EPS) bearer identity of at least one UE that meets a predetermined condition; and
wherein before sending the SRVCC handover request message that carries the identifier of the target UE, the method further comprises one of the following:
(a) determining, by the MME according to the EPS bearer identity of the UE that meets the predetermined condition, a UE whose voice bearer is established on the network side of the LTE network as the target UE; and
(b) determining, by the MME according to the EPS bearer identity of the UE that meets the predetermined condition, a UE whose voice bearer is established on the network side of the LTE network and that supports an SRVCC handover as the target UE.

3. The method according to claim 2, wherein
the connection exception message is sent by the first network device after the first network device detects that the exception occurs on the user plane connection between the first network device and a second network device; and
the UE that meets the predetermined condition performs service transmission by using the user plane connection between the first network device and the second network device.

4. The method according to claim 2, wherein
the connection exception message is sent by the first network device after the first network device determines that the first network device needs to be restarted; and
the UE that meets the predetermined condition performs service transmission by using a user plane of the first network device.

5. The method according to claim 3, wherein
that the exception occurs on the user plane connection comprises one of the following situations: (a) the user plane connection is interrupted, and (b) congestion occurs on the user plane connection.

6. The method according to claim 5, wherein the congestion occurs on the user plane connection when at least one of the following conditions are met: (a) a packet loss rate of the user plane connection is greater than a first preset threshold; (b) a delay of the user plane connection is greater than a second preset threshold; and (c) a jitter of the user plane connection is greater than a third preset threshold,
wherein the first preset threshold is a preset critical value for determining, by using the packet loss rate of the user plane connection, that the congestion occurs on the user plane connection; the second preset threshold is a preset critical value for determining, by using the delay of the user plane connection, that the congestion occurs on the user plane connection; and the third preset threshold is a preset critical value for determining, by using the jitter of the user plane connection, that the congestion occurs on the user plane connection.

7. A mobility management entity (MME), comprising:
a processor, and
a memory coupled to the processor and storing processor-executable instructions which when executed causes the processor to implement operations including:
determining that an exception occurs on a network side of a Long Term Evolution (LTE) network, wherein a voice bearer of a target user equipment (UE) is established on the network side of the LTE network; and
sending, to an evolved NodeB (eNodeB), a single radio voice call continuity (SRVCC) handover request message that carries an identifier of the target UE, to enable the eNodeB to hand over a voice service of the target UE from the LTE network to a circuit switched (CS) network, wherein the operations further include:
receiving a handover request message sent by the eNodeB, wherein the handover request message is used to notify the MME that the target UE needs to be handed over from the eNodeB to a target eNodeB; and
determining that the target UE fails to be handed over from the eNodeB to the target eNodeB.

8. A mobility management entity (MME), comprising:
a processor, and
a memory coupled to the processor and storing processor-executable instructions which when executed causes the processor to implement operations including:
determining that an exception occurs on a network side of a Long Term Evolution (LTE) network, wherein a voice bearer of a target user equipment (UE) is established on the network side of the LTE network; and sending, to an evolved NodeB (eNodeB), a single radio voice call continuity (SRVCC) handover request message that carries an identifier of the target UE, to enable the eNodeB to hand over a voice service of the target UE from the LTE network to a circuit switched (CS) network, wherein the operations further include:

receiving a connection exception message sent by a first network device, wherein the connection exception message is used to feed back a result that the exception occurs on a user plane connection, and the connection exception message comprises an evolved packet system EPS bearer identity of at least one UE that meets a predetermined condition; and before sending, to the evolved NodeB (eNodeB), the SRVCC handover request message, determining, according to the EPS bearer identity of the UE that meets the predetermined condition, a UE whose voice bearer is established on the network side of the LTE network as the target UE; or determine, according to the EPS bearer identity of the UE that meets the predetermined condition, the UE whose voice bearer is established on the network side of the LTE network and that supports an SRVCC handover as the target UE.

9. The MME according to claim 8, wherein the operations further include:

receiving the connection exception message that is sent by the first network device after the first network device detects that the exception occurs on the user plane connection between the first network device and a second network device; and wherein the UE that meets the predetermined condition performs service transmission by using the user plane connection between the first network device and the second network device.

10. The MME according to claim 8, wherein the operations further include:

receiving the connection exception message that is sent by the first network device after the first network device determines that the first network device needs to be restarted; and wherein the UE that meets the predetermined condition performs service transmission by using a user plane of the first network device.

11. The MME according to claim 8, wherein that the exception occurs on the user plane connection comprises one of the following situations: (a) the user plane connection is interrupted, and (b) congestion occurs on the user plane connection.

12. The MME according to claim 11, wherein the congestion occurs on the user plane connection when at least one of the following conditions are met: (a) a packet loss rate of the user plane connection is greater than a first preset threshold; (b) a delay of the user plane connection is greater than a second preset threshold; and (c) a jitter of the user plane connection is greater than a third preset threshold, wherein the first preset threshold is a preset critical value for determining, by using the packet loss rate of the user plane connection, that the congestion occurs on the user plane connection; the second preset threshold is a preset critical value for determining, by using the delay of the user plane connection, that the congestion occurs on the user plane connection; and the third preset threshold is a preset critical value for determining, by using the jitter of the user plane connection, that the congestion occurs on the user plane connection.

* * * * *